(12) United States Patent
Singh et al.

(10) Patent No.: US 11,978,059 B2
(45) Date of Patent: May 7, 2024

(54) GUIDED PROBLEM RESOLUTION USING MACHINE LEARNING

(71) Applicant: Dell Products L. P., Round Rock, TX (US)

(72) Inventors: Shalu Singh, Round Rock, TX (US); Amit Sawhney, Round Rock, TX (US); Karthik Ranganathan, Round Rock, TX (US); Mohammed Amin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 402 days.

(21) Appl. No.: 16/796,454

(22) Filed: Feb. 20, 2020

(65) Prior Publication Data
US 2021/0264438 A1    Aug. 26, 2021

(51) Int. Cl.
*G06Q 30/016* (2023.01)
*G06N 20/00* (2019.01)
*G06Q 10/20* (2023.01)
*G06F 40/40* (2020.01)

(52) U.S. Cl.
CPC .......... *G06Q 30/016* (2013.01); *G06N 20/00* (2019.01); *G06Q 10/20* (2013.01); *G06F 40/40* (2020.01)

(58) Field of Classification Search
None
See application file for complete search history.

(56) References Cited

U.S. PATENT DOCUMENTS

| 8,533,661 | B2 | 9/2013 | Nucci et al. |
| 8,589,207 | B1 | 11/2013 | Macosky et al. |
| 8,782,103 | B2 | 7/2014 | Ahlborn |
| 8,805,716 | B2 | 8/2014 | Michel et al. |

(Continued)

FOREIGN PATENT DOCUMENTS

WO    WO9948018    * 9/1999    ............ G06F 15/18

OTHER PUBLICATIONS

Indranil Bose, Radha K. Mahapatra, "Business data mining—a machine learning perspective, Information & Management", vol. 39, Issue 3, 2001, pp. 211-225, ISSN 0378-7206 (Year: 2001).*

(Continued)

*Primary Examiner* — Paul R Fisher
(74) *Attorney, Agent, or Firm* — Krishnendu Gupta; Deepika Bhayana; Lesley A. Leonessa

(57) ABSTRACT

Methods and systems are disclosed that include receiving problem information from a user interface at a resolution identification system, receiving product information at the resolution identification system, and performing machine learning analysis of the problem information and the product information. The machine learning analysis produces one or more model outputs, and is performed by a machine learning system of the resolution identification system, using one or more machine learning models. Each of the one or more machine learning models produces a corresponding one of the one or more model outputs. Such a method can further include generating resolution information by performing an action identification operation using the one or more model outputs, and outputting the resolution information from the resolution identification system. The resolution information is output to the user interface.

20 Claims, 13 Drawing Sheets

(56) References Cited

U.S. PATENT DOCUMENTS

| | | | |
|---|---|---|---|
| 8,943,076 | B2 | 1/2015 | Stewart et al. |
| 9,015,106 | B2 | 4/2015 | Nucci et al. |
| 9,069,898 | B2 | 6/2015 | Nucci et al. |
| 9,092,244 | B2 | 7/2015 | Stewart et al. |
| 9,158,782 | B2 | 10/2015 | Nucci et al. |
| 9,176,711 | B2 | 11/2015 | Nucci et al. |
| 9,183,074 | B2 | 11/2015 | Michel et al. |
| 9,606,995 | B2 | 3/2017 | Nucci et al. |
| 9,710,282 | B2 | 7/2017 | Nucci et al. |
| 9,864,673 | B2 | 1/2018 | Michel et al. |
| 10,362,169 | B1* | 7/2019 | Sanderlin ............... H04M 3/493 |
| 10,440,187 | B1* | 10/2019 | Mandel ............... H04M 3/5183 |
| 10,498,858 | B2 | 12/2019 | Morton et al. |
| 10,564,951 | B2 | 2/2020 | Andrews et al. |
| 10,764,431 | B1* | 9/2020 | Pham ................. H04M 3/42221 |
| 10,803,399 | B1* | 10/2020 | Cohen ..................... G06F 16/93 |
| 10,904,298 | B2* | 1/2021 | Sondhi .................. G06N 20/00 |
| 11,294,784 | B1* | 4/2022 | Bergman ............... G06N 20/00 |
| 2004/0243554 | A1* | 12/2004 | Broder ................... G06F 16/38 |
| 2010/0169323 | A1* | 7/2010 | Liu .................. G06F 18/24147 |
| | | | 707/748 |
| 2010/0185689 | A1* | 7/2010 | Hu ........................... G06F 40/30 |
| | | | 707/E17.108 |
| 2010/0191682 | A1* | 7/2010 | Takamatsu ............. G06Q 30/02 |
| | | | 706/12 |
| 2013/0114100 | A1* | 5/2013 | Torii .................. H04N 1/00037 |
| | | | 358/1.14 |
| 2013/0282628 | A1* | 10/2013 | Bengfort ................. G06F 16/36 |
| | | | 706/12 |
| 2013/0339373 | A1* | 12/2013 | Patton ............... G06F 16/90324 |
| | | | 707/749 |
| 2014/0258189 | A1* | 9/2014 | Schmidt .................. G06N 7/01 |
| | | | 706/12 |
| 2014/0280120 | A1* | 9/2014 | Sharp ................ G06F 16/24578 |
| | | | 707/732 |
| 2017/0223190 | A1* | 8/2017 | Mandel .......... G06Q 10/063112 |
| 2017/0302540 | A1* | 10/2017 | Monahan ............ H04L 41/5038 |
| 2017/0353582 | A1* | 12/2017 | Zavesky ............... H04L 67/125 |
| 2017/0372231 | A1* | 12/2017 | Ghatage .................. G06F 40/58 |
| 2018/0204111 | A1* | 7/2018 | Zadeh .................... G06N 3/043 |
| 2018/0285750 | A1* | 10/2018 | Purushothaman ..... G06N 5/045 |
| 2018/0313880 | A1* | 11/2018 | Logan .................. G01R 23/155 |
| 2019/0340004 | A1* | 11/2019 | Garay .................. G06F 9/5027 |
| 2019/0361951 | A1* | 11/2019 | Jayavelu ............. G06F 16/9536 |
| 2020/0019893 | A1* | 1/2020 | Lu ........................... G06N 20/00 |
| 2020/0134012 | A1* | 4/2020 | Zakharov ............... G06N 20/00 |
| 2020/0136928 | A1* | 4/2020 | Sethi ...................... G06N 20/00 |
| 2020/0250687 | A1* | 8/2020 | Jagota .................... G06N 3/084 |

OTHER PUBLICATIONS

Li, Yuangui, Weidong Zhang, and Chen Lin. "Simplify support vector machines by iterative learning." Neural Information Processing: Letters and Reviews 10.1 (2006): 11-17. (Year: 2006).*

A. Pesaranghader, A. Pesaranghader, N. Mustapha and N. M. Sharef, "Improving multi-term topics focused crawling by introducing term Frequency-Information Content (TF-IC) measure," 2013 International Conference on Research and Innovation in Information Systems (ICRIIS) (Year: 2013).*

J. Wexler, M. Pushkarna, T. Bolukbasi, M. Wattenberg, F. Viégas and J. Wilson, "The What-If Tool: Interactive Probing of Machine Learning Models," in IEEE Transactions on Visualization and Computer Graphics, vol. 26, No. 1, pp. 56-65, Jan. 2020, doi: 10.1109/TVCG.2019.2934619. (Year: 2020).*

* cited by examiner

GUIDED PROBLEM RESOLUTION USING MACHINE LEARNING

BACKGROUND

Technical Field

This invention relates generally to resolution of customer problems and, more particularly to the identification of a course of action to resolve a problem through the use of machine learning techniques.

Description of Related Technologies

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Such information handling systems have readily found application in a variety of applications, including customer service applications (e.g., in the context of customer support environments such as call centers). Information handling systems employed in such customer service applications are able to provide large amounts of information to customer service representatives tasked with assisting customers in resolving problems encountered by such customers. For example, such customer service applications can allow customer service representatives to access all manner of information regarding a product with which a customer might be encountering a problem. Unfortunately, such a deluge of information also represents an obstacle to the provision of effective, efficient assistance to such customers. Further, such an approach relies heavily on the knowledge, experience, and judgment of the customer service representative, leading to inconsistent performance with regard to the resolution of customers' problems. Further still, such reliance, coupled with the large amounts of information provided by such systems, leads to an increase in the likelihood of unsuccessful resolutions.

SUMMARY

This Summary provides a simplified form of concepts that are further described below in the Detailed Description. This Summary is not intended to identify key or essential features and should therefore not be used for determining or limiting the scope of the claimed subject matter.

Methods and systems such as those described herein provide for the identification of a course of action to resolve a customer problem through the use of machine learning techniques. In some embodiments, such a method can include receiving problem information from a user interface at a resolution identification system, receiving product information at the resolution identification system, and performing machine learning analysis of the problem information and the product information. The problem information describes one or more characteristics of a problem. The product information describes one or more characteristics of a product. The machine learning analysis produces one or more model outputs, and is performed by a machine learning system of the resolution identification system, using one or more machine learning models. Each of the one or more machine learning models produces a corresponding one of the one or more model outputs. Such a method can further include generating resolution information by performing an action identification operation using the one or more model outputs, and outputting the resolution information from the resolution identification system. The resolution information is output to the user interface.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Overview

Figure 1:
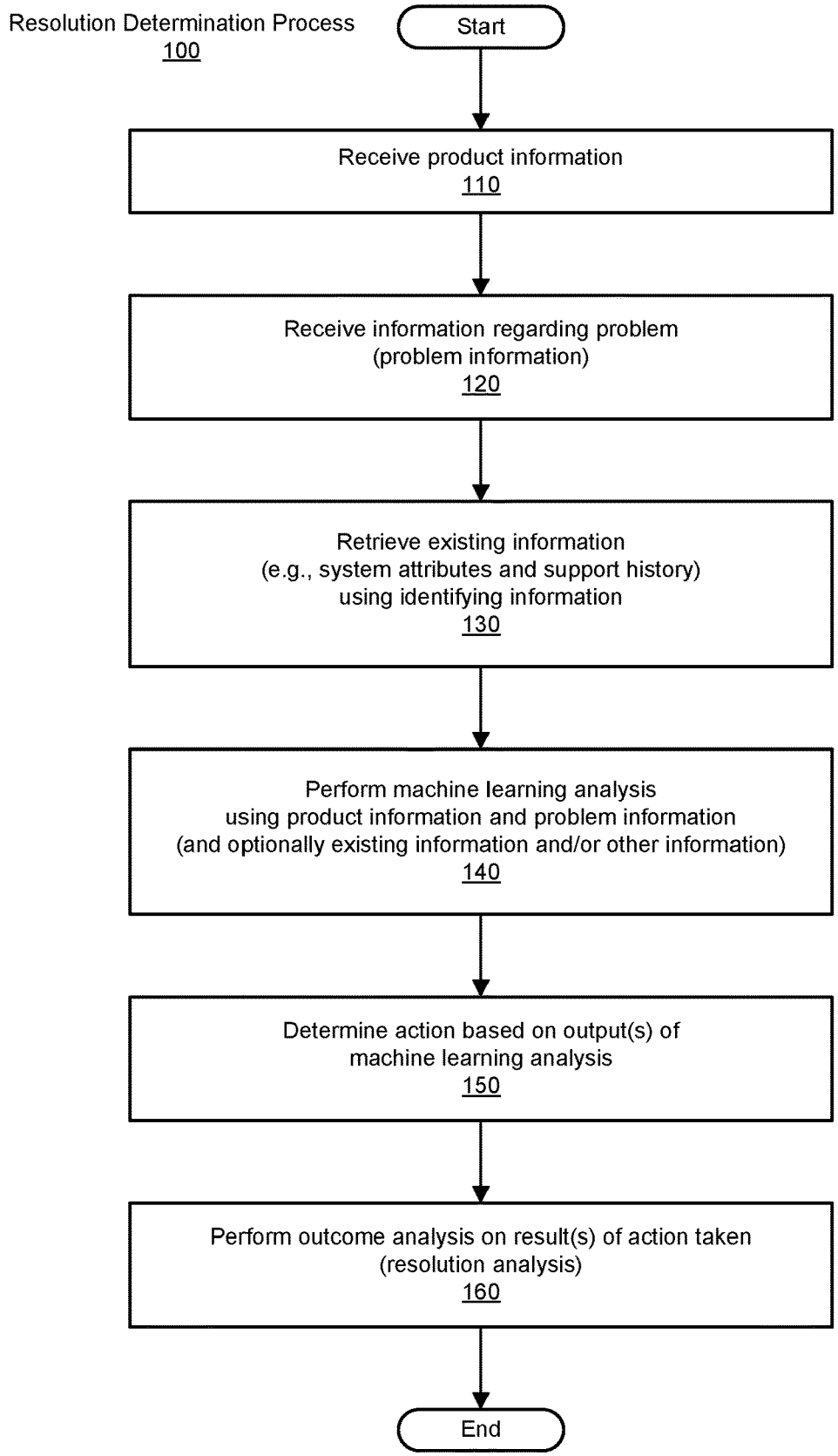
FIG. 1 is a simplified flow diagram illustrating an example of a resolution determination process, according to some embodiments.

Methods and systems such as those described herein can be implemented, for example, as a method, network device, and/or computer program product, and provide for the identification of a course of action to resolve a problem using machine learning (ML) techniques. For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As noted, certain embodiments of methods and systems such as those disclosed herein can include operations such as receiving problem information from a user interface at a resolution identification system, receiving product information at the resolution identification system, and performing machine learning analysis of the problem information and the product information. The problem information describes one or more characteristics of a problem. The product information describes one or more characteristics of a product. The machine learning analysis produces one or more model outputs, and is performed by a machine learning system of the resolution identification system, using one or more machine learning models. Each of the one or more machine learning models produces a corresponding one of the one or more model outputs. Such a method can further include generating resolution information by performing an action identification operation using the one or more model outputs, and outputting the resolution information from the resolution identification system. The resolution information is output to the user interface.

In certain embodiments, the product information described elsewhere herein can include identifying information identifying the item in question (e.g., service tag information (or more simply, tag information) for a given product (e.g., a service tag for computing device), serial number, or other such information). Various embodiments implement the problem information as error information (e.g., as may regard an error experienced in the operation of the product), problems encountered in the use of such a product, symptom information (e.g., as may regard a symptom exhibited by the product during its operation), and/or information regarding difficulties encountered in other such circumstances. As may also be advantageous, data preprocessing and natural language processing can be performed on the information received, in preparing such information for use as inputs to the machine learning systems described herein.

In certain embodiments, the machine learning analysis performed includes one or more machine learning models. Such machine learning models can be trained prior to their use, as well as during their use. Further, the machine learning systems can employ machine learning models such as a guided path (GP) model, a soft model, a hard model, and/or a cluster model. In certain embodiments, such machine learning analysis can employ techniques such as logistical regression, as discussed in greater detail subsequently.

In certain embodiments, outcome analysis is performed. Such outcome analysis can be based on, for example, the resolution information. The outputs of such outcome analysis can be provided to the machine learning analysis system (s), in order to facilitate such systems ability to adapt to changing problem causes, and so, provide improved problem resolutions.

INTRODUCTION

As noted, methods and systems such as those described herein provide for the identification of a course of action to resolve a problem through the use of machine learning techniques. Such methods and systems include the use of machine learning techniques to analyze available information, and, in certain embodiments, can do so using minimal inputs (e.g., in the case of providing customer support for a computing device, identifying information that uniquely identifies the particular computing device and a description of the problem encountered).

As will be appreciated, the simplistic approaches to resolving problems with a given product employed heretofore (e.g., in the customer support context) leave a great deal to be desired. One example of such situations is a customer contacting a customer service representative (e.g., at a call center) with regard to a problem encountered in the operation (the functioning, or lack thereof, of the product itself) or use of the product by a customer. While call center information systems are able to provide large amounts of information to customer service representatives tasked with assisting customers in resolving problems encountered by such customers, such a flood of information can itself present an obstacle to assisting the customer. Further, such an approach relies heavily on the knowledge, experience, and judgment of the customer service representative, leading to inconsistent performance with regard to the resolution of customers' problems. Further still, such reliance, coupled with the large amounts of information provided by such systems, leads to an increase in the likelihood of unsuccessful resolutions. The accuracy with which the customer relates information regarding the problem can also affect the likelihood of successful problem resolution. Thus, as will be appreciated, such troubleshooting efforts represent a complex process, where symptom interpretation depends heavily on the communication skills of the customer and customer service agent. While a customer service agent can attempt to effect clear communications, the issue identification performed often relies upon open-ended questions and manual information searches by the customer service agent.

Moreover, existing call center information systems have no capabilities that might help customer service representatives compensate for such inadequacies and address such systemic shortcomings (e.g., as by standardizing the interactions of such customer service representatives and customers with such systems, by learning from existing information, and by adapting to new situations presented in such contexts). Further still, such existing call center information systems can fail to provide for the consideration of known issues that might impact issues encountered by end-users. As will therefore be appreciated, such interactions tend to be long and wide-ranging, and so are inefficient in terms of the time and resources involved, not to mention deleterious to the customer experience.

Such problems can be addressed through the implementation of guided problem resolution approaches that employ methods and systems such as those described herein. Such guided problem resolution techniques address these issues by bringing to bear machine learning techniques that are designed to consume certain types of information (e.g., such as product information and problem information) and, from such information types, produce one or more recommended actions intended to resolve the problem presented. By implementing machine learning techniques specifically applicable to the context of assisting a given user of a given product in the resolution of problems encountered in such product's use, such methods and systems avoid the problems associated with, for example, the need for customer service representatives to sift through large amounts of information, and so avoid the complications such approaches engender. In so doing, such systems address problems related to inconsistent outcomes caused by a lack of experience and/or poor judgement of customer service representatives.

Moreover, an additional advantage provided by such systems is the more efficient (and so quicker) resolution of problems. In fact, methods and systems such as those described herein can, in certain situations, perform all operations necessary to provide a user (e.g., a customer) with a resolution to the problem at hand, obviate the need for interaction with a customer service representative altogether (referred to herein as "self-service" problem resolution). In this regard, methods and systems such as those described herein are able to learn the manner in which a product's users describe various problems they encounter, and in so doing, are able to more accurately characterize such problems. Such increases in accuracy facilitate a more efficient use of resources, particularly in the context of computing resources (which becomes even more meaningful when such methods and systems are employed in a self-service context). Further still, methods and systems such as those described herein facilitate resolution by way of their To achieve such advantages, methods and systems such as those described herein provide for the automated generation of microservice modification information (e.g., in the form of one or more recommendations) directed to the improved performance of the given microservices and their supporting systems. Such microservice modification information is generated as part of the operations of what is described herein as a microservice production management server. Such methods and systems provide a mechanism to autodiscover microservices and support the creation of an organization-wide microservices map, and do so independently through the use of lexical analysis and machine learning.

Such a solution can involve, for example, operations such as the following. In certain embodiments, information regarding a product (product information) and a problem (problem information) are gathered from various sources. After being processed, such information is fed into one or more machine learning systems (employing one or more machine learning models), and the output thereof (one or more recommended actions intended to resolve the given problem) generated. Such recommended actions are then provided to a user of the system (e.g., a customer service representative, an end-user of the product/customer, or the like). Methods and systems such as those described herein can thus be used to augment (or replace) the decision-making process (e.g., when diagnosing and resolving technical support issues for a given product). A user interface for such a system can, for example, facilitate user input with respect to symptoms describing a customer's problem, as well as asset-specific product information, and then use this and other information to generate possible actions to resolve the problem. There are four machine learning models implemented in the tool, as well as additional layers incorporating natural language processing and business rules to determine which possible action is the next best action.

In certain embodiments, a user is given the opportunity to enter two pieces of information: identifying information that identifies the item (product and/or service; a serial number, a service tag, or the like, possibly included in product information regarding the item) and a problem description (problem information, or at least information regarding the issue encountered or relevant question). From just two such inputs, the relevant recommendations can be made. In such an embodiment, a user provides the identifying information, which is used to locate information specific to the asset with the problem (and asset being the specific instance of a given product presently used by a customer, for example). Also provided is problem information, which can be, for example, text describing a problem encountered, a question regarding the product identified by the identify information, or other such inquiry. In the case of an inquiry regarding a problem (e.g., information regarding a failure, error, symptom, or the like), problem information is subjected to data preprocessing and natural language processing, which results in prepared data.

Machine learning analysis is then performed on the prepared data is then performed, in order to produce the one or more actions recommended to address the problem at hand. In a computing device scenario, recommended actions can include "soft" fixes (in which the given problem can be fixed remotely by performing particular actions (e.g., a hard reset) or using software (e.g., installing update drivers)), "hard" fixes (in which a service dispatch, including parts, labor, or both, is needed), or, in the case of more complicated problems, the implementation of a guided path process (in which a guided path is followed to troubleshoot the given computing device and gather additional information). In view of this, the examples provided subsequently describe three machine learning models, one corresponding to each of the foregoing scenarios, which can be invoked. Also described is a cluster model that takes as its input one or more keywords, and determines clustering of problems and the resolutions using such inputs.

Thus, a guided resolution architecture according to the methods and systems described herein provides a number of advantages. These include the ability of such an architecture to adapt its functionality and behavior to changes in the operational environment (e.g., as to new products and problems) to, and in so doing, to facilitate self-adaptability in response to such changes by way of feedback and the availability of new product information, additional historical information, and the like (it being appreciated that historical information employed by methods and systems such as those described herein can be specific to a given asset (a specific instance of the given product) or more broadly, to a given group of assets, product model, product brand, and other such aggregations). In certain embodiments, such methods and systems are able to learn from user feedback provided during the customer support experience, and revise predictions and recommendations made in "real time" (in under 30 seconds, in a call center context), as may be suggested by the data and machine learning models. Further, such methods and systems provide for the efficient, effective implementation of problem resolution alternatives through such methods and systems use of machine learning, thereby providing action recommendations with acceptably-high confidence (as by the prediction of the next best action to be taken). Further still, such methods and systems support the visualization of one or more outputs (one or more potential resolutions) of the machine learning models employed, as well as the level of confidence that can be attributed to such potential resolutions. Further still, such methods and systems are able to take into account business imperatives by way of the generation and maintenance of business rules. These and other advantages will be apparent in view of the following description and associated figures.

Example Overall Guided Resolution Process Employing Machine Learning

FIG. 1 is a simplified flow diagram illustrating an example of a resolution determination process, according to some embodiments. To that end, FIG. 1 depicts a resolution determination process 100. The basic steps accomplished by resolution determination process 100 include the gathering of information (e.g., symptoms, information regarding failures, and the like), the interpretation of this information (also referred to herein as symptom interpretation), the identification of issues (also referred to herein as issue identification), and one or more actions to be taken in an effort to resolve the problems giving rise to the need to perform resolution determination process 100. Resolution determination process 100 begins with the receipt of product information (e.g., such as a serial number, service tag information, or other such information regarding a product) at a resolution identification system (e.g., such as that described subsequently) (110). Such product information can also include technical support information for the product, repair service information for the particular item, field service information for the product and/or particular item, online service information for the product and/or the particular item, telemetry data from the particular item, social media data, and/or routing and voice data, among other such types of information. The resolution identification system also receives information regarding a problem (also referred to herein as problem information) (120). As with the aforementioned product information, such problem information can include the aforementioned information types, among other such types of information, for the problem encountered (e.g., including one or more error codes and/or symptom information). It will be further appreciated that such a problem may represent a failure in the given product, faulty operation of the given product (thereby permitting one or more symptoms of such faulty operation to be gathered), simply a question as to the proper operation of the given product, and other such inquiries, as might be addressed to customer support representatives in a customer support environment. Further still, such product information and problem information can be used to generate and/or retrieve additional contextual information automatically. For example, a product's identifying information (e.g., serial number, service tag, or the like) can be used to determine the product's brand, model, age, and other such information, as well as historical information regarding the product's service history, other attempts to address the problem at hand, and other such information. Sources of such information can include diagnostic logs for the product, a case title and/or description, agent logs/chat transcripts/contact history from prior contacts from the customer, service department dispatch history, web history, Interactive Voice Response (IVR)/telephony transcripts, and/or other such information.

In the case in which the product information includes identifying information such as a serial number, service tag information, or comparable information identifying, for example, a computing device, such identifying information can be used to retrieve/analyze existing information regarding the product in question (e.g., such as system attributes and support history for a computing device) (130). Such retrieved information can include, for example, component information, product specifications, repair history, information regarding earlier customer inquiries regarding the given product and/or related/independent problems (as well as transcripts regarding same), and the like. In this regard, the resolution identification system works to aggregate information that may itself prove useful in determining one or more actions to be taken to resolve the given problem, as well as providing an avenue to other information, be that additional customer support information and/or trends that might be deduced from such information using the machine learning model(s) employed.

Having received the product information and the problem information (and, optionally, the aforementioned existing information), resolution determination process 100 proceeds with performing one or more machine learning analyses using such product information and problem information (and, optionally, existing information and/or other information) (140). Using the machine learning outputs of the one or more machine learning analyses, resolution determination process 100 then makes a determination as to one or more recommended actions (150). Such recommended action(s) (also referred to herein, in the generic, as a "next best action") is, in certain embodiments, determined based on a combination of such machine learning outputs. In so doing, machine learning analyses provide for the correlation between inputs, context, and a particular outcome, as well as for the correlation of historical inputs (e.g., for confidence scoring), thereby providing the ability to predict outcomes for current inputs and given context, Such machine learning analyses (and the machine learning models such analyses employ), as well as various means of combining they are machine learning outputs, are discussed in greater detail subsequently.

Next, having determined the action to be recommended to (at least potentially) resolve the given problem, resolution determination process 100 proceeds with performing outcome analysis on the results produced by taking the recommended action (160). It should be appreciated that, at this juncture, external factors that impact the outcome's sufficiency, usefulness, desirability, and/or other such measures intended to capture differences between a desired outcome and that actually achieved, can be considered as part of the aforementioned outcome analysis.

Such outcome analysis (also referred to herein as "resolution analysis") can include any number of techniques, including, but not limited to, receipt of user feedback, statistical analyses, receipt of results (e.g., as by querying a computing device, telemetry reports from the computing device, and or other such methods), and/or the like. The results of such resolution analysis can then be fed back into the machine learning systems, as well as certain of the product information sources and machine learning inputs. Resolution determination process 100 then concludes.

Example Guided Resolution Architectures Employing Machine Learning

Figure 2A:
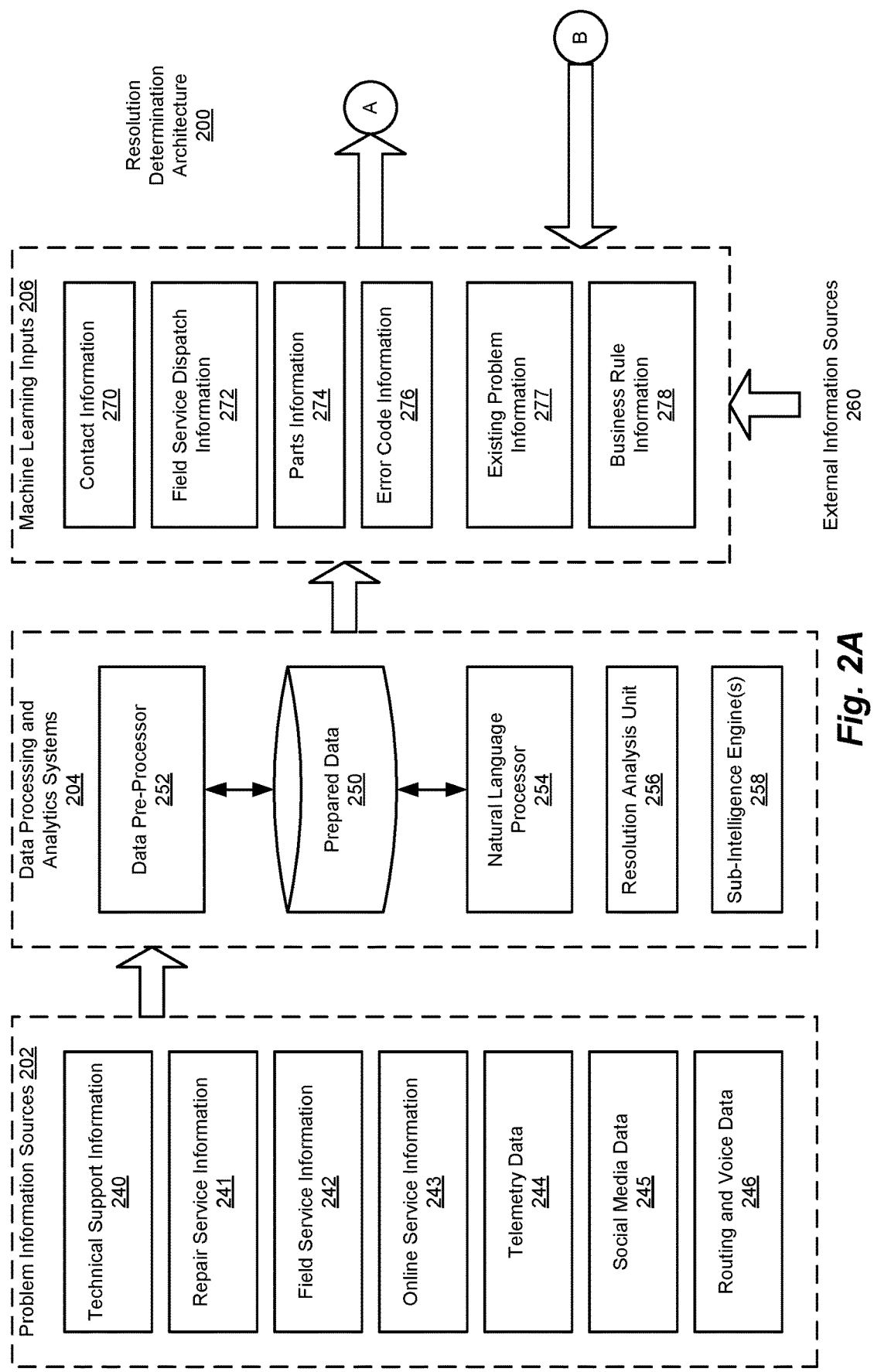
FIGS. 2A and 2B are simplified block diagrams illustrating an example of a resolution determination architecture that can be employed to implement a resolution determination process such as that in FIG. 1, according to some embodiments.
Figure 2B:
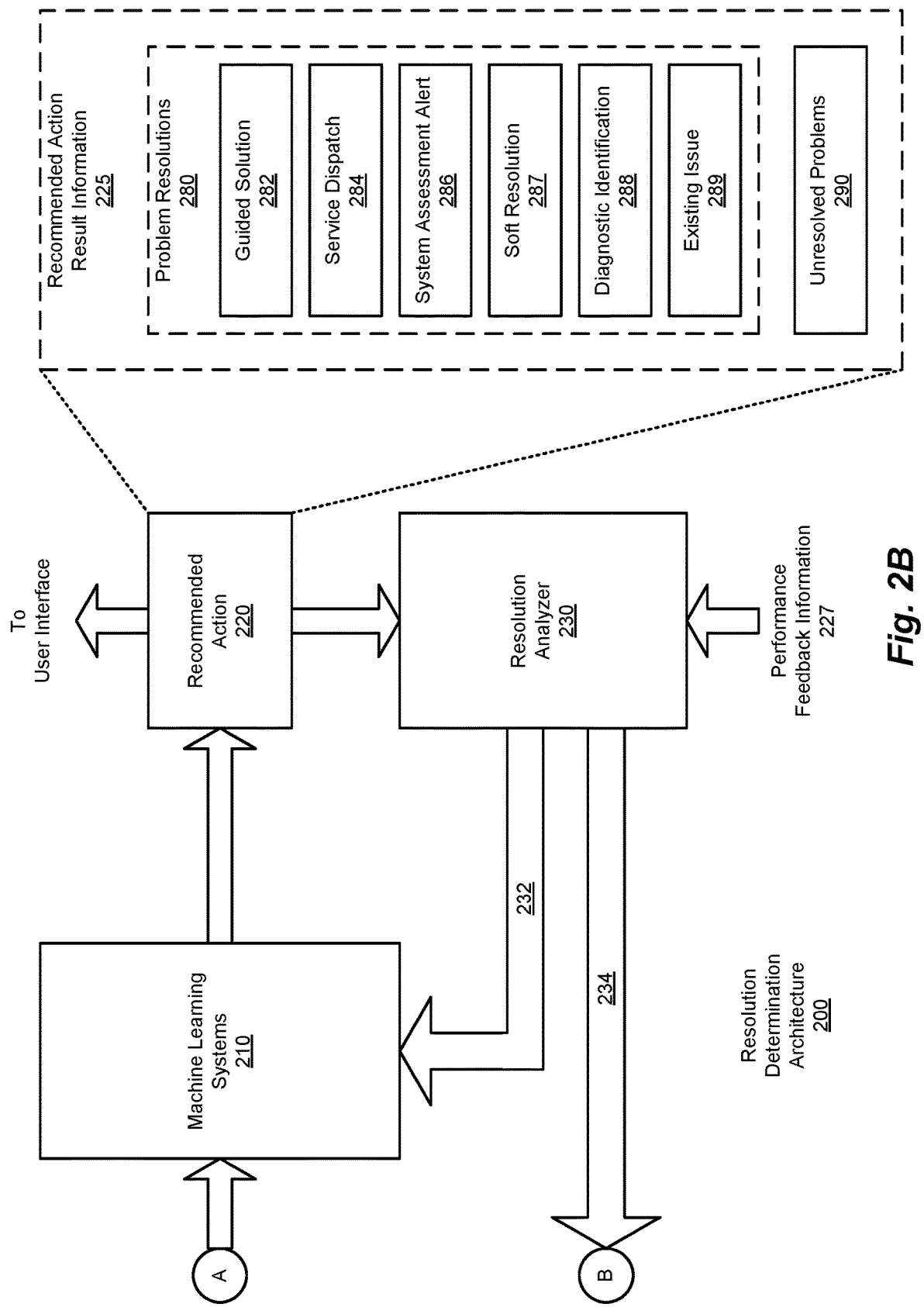

FIGS. 2A and 2B are simplified block diagrams illustrating an example of a resolution determination architecture that can be employed to implement a resolution determination process such as that in FIG. 1, according to some embodiments. To that end, FIGS. 2A and 2B depict a resolution determination architecture 200, which includes problem information sources 202, data processing and analytics systems 204, and machine learning inputs 206. Problem information sources 202 provide various types of information (discussed subsequently) to data processing and analytics systems 204 (also discussed subsequently), which perform processing and analysis of such information to produce certain of machine learning inputs 206 (also discussed subsequently).

In turn, machine learning inputs 206 are provided to one or more machine learning systems (depicted in FIG. 2B as machine learning systems 210), by way of connector "A". Machine learning systems 210 produce a recommended action 220, which can be described by recommended action result information 225. Recommended action result information 225 and, optionally, performance feedback information 227, are provided to a resolution analyzer 230. Resolution analyzer 230 analyzes information regarding the resolution provided by recommended action 220, generating feedback therefrom. The feedback generated is provided to machine learning systems 210 as feedback 232, and to certain of the information sources of machine learning inputs 206, as feedback 234.

As noted, problem information sources 202 provide information to the processes performed by data processing and analytics systems 204. Problem information sources 202 represents a number of information sources, which can include, for example, one or more of the following: technical support information 240, repair service information 241, field service information 242 (e.g., as might be received from field service personnel), online service information 243, telemetry data 244, social media information 245, and routing invoice information 246, among other such sources of information.

Data processing and analytics systems 204 take as their input information sourced from problem information sources 202, as noted. In the embodiment shown in FIG. 2A as part of resolution determination architecture 200, data processing and analytics systems 204 receive information from problem information sources 202 and store this information as incoming data (depicted in FIG. 2A as prepared data 250). Typically, information received from problem information sources 202 is received by data processing and analytics systems 204 at, for example, a data preprocessor 252. Data preprocessor 252, in certain embodiments, performs operations such as data preprocessing and data cleansing, in order to prepare information received from problem information sources 202 for natural language processing and other such operations. The data preprocessing and data cleansing performed by data preprocessor 252 can include operations such as stop word removal, tokenization of the problem information (e.g., using lexical analysis), stemming of words in the problem information (e.g., where such stemming performs a process of reducing inflected (or sometimes derived) words to their word stem, base, or root form), and term frequency-inverse document frequency (TFIDF) analysis. In the present context, such TFIDF techniques employ a numerical statistic that is intended to reflect how important a word is to a document in a collection or corpus. It is often used as a weighting factor in searches of information retrieval, text mining, and user modeling. A TFIDF value increases proportionally to the number of times a word appears in the document and is offset by the number of documents in the corpus that contain the word, which helps to adjust for the fact that some words appear more frequently in general.

In certain embodiments, data preprocessor 252 performs preprocessing operations on the information received from problem information sources 202 and then stores this preprocessed data as prepared data 250. Natural language processing can then be performed on repair data 250 by a natural language processor 254. Natural language processor 254 can employ one or more of a number of natural language processing techniques to process the prepared data into a better form for use as one or more of machine learning inputs 206. Such techniques can include, for example, keyword extraction, relationship extraction (e.g., the extraction of semantic relationships between words and/or phrases from prepared data 250), part-of-each tagging, concept tagging, summarization, and sentiment analysis classification, among other such techniques applicable to information received as problem information and preprocessed by data preprocessor 252. Thus, the preprocessing of problem information need not employ a predefined list of keywords. Rather, keywords can be extracted dynamically from the problem information received. For example, natural language processing can be applied in order to remove common words and numbers (e.g., "the", "on", "and", "42", and so on), remove words that do not add value to a problem description (e.g., "not working", "issues", and so on), remove words that are common in past tech support logs but not indicative of the problem (e.g., operating system, operating system version, and so on), removing words specific to the asset that can be obtained more efficiently otherwise (e.g., warranty information, brand information, and so on), replacing common abbreviations with standard descriptions (in order to provide for more consistent input to the machine learning systems; e.g., replacing "HDD" with "hard drive" and so on), and other such operations. The text which remains can be treated as the extracted keywords. Such a dynamic processing approach facilitates the machine learning systems' adaptability, and so, the ability to handle new problems, as well as recording such new problems and their associated characteristics, quickly and efficiently. Further in this regard, keyword weighting can be employed (based either on historical experience or expected importance of given keywords), in order to further improve the efficacy of the actions ultimately recommended.

Additionally, beyond preprocessing to identify keywords, a given problem's description is classified into an problem type, a classification which can be, for example, determined by a machine learning model. Based on historical data, the classification model can comprehend a number of problem types, which can be used to inform the business rules applied later in the process. As will also be appreciated in light of the present disclosure, the processing performed by data preprocessor 252 and natural language processor 254 can, in fact, be performed in an iterative fashion, until prepared data 250 reaches an acceptable level of accuracy and conciseness, such that prepared data 250 is in condition for use by other components of resolution determination architecture 200.

Certain aspects of data processing and analytics systems 204 also include the provision of data analytics functionality. In certain embodiments, examples of such functionality is the analysis performed by a resolution analysis unit 256 and one or more sub-intelligence engines 258. Resolution analysis unit 256 can analyze available information in order to identify historically successful resolutions using techniques such as identifying reasons for repeated contacts and/or the identification of multiple situations in which a problem resulted from a given cause. Further, resolution analysis unit 256 can make determinations as to commodity pairs, diagnostics compliance, risk predictions (e.g., as for the risk of failure), and intent/persona identification (e.g., as to the customer in question). Sub-intelligence engines 258 can be created and subsequently integrated to allow for the processing of repair information, information from field service, and/or voice transcripts. Sub-intelligence engines 258 can be implemented as a type of enterprise information management that combines business rule management, predictive analytics, and prescriptive analytics to form a unified information-access platform that provides real-time intelligence through search technologies, dashboards, and/or existing business infrastructure. An intelligence engine such as those of sub-intelligence engines 258 are created as part of data processing and analytics systems 204 as process- and/or business-problem-specific solutions, and so results in application- and/or function-specific solutions.

Information provided by problem information sources 202, once processed by data processing and analytics systems 204, are then presented as certain ones of machine learning inputs 206. As will be appreciated in light of the present disclosure, certain embodiments of resolution determination architecture 200 take as machine learning inputs 206 outputs from data processing and analytics systems 204 (e.g., prepared data 250), as well as, potentially, information from one or more external information sources 260 and feedback 234 from resolution analyzer 230 (designated in FIG. 2A by connector "B"). Such information can be stored in machine learning inputs 206, for example, as contact information 270 (e.g., information regarding a customer), field service dispatch information 272 (e.g., information regarding the dispatches of field service, including personnel and/or parts), parts information 274, error code information 276, existing problem information 277, and business rule information 278, among other forms of information. Business rule information 278 can include rules that address a number of situations. For example, business rule information 278 can include business rules that result in a preference for lower cost resolutions (e.g., soft actions determined using an online, self-service web site), as opposed to higher cost resolutions (e.g., a service dispatch initiated by a customer service representative). As noted, business rule information 278 can also be updated with respect to problem types during the preprocessing of problem information.

Machine learning inputs 206 are presented to machine learning systems 210, via connector "A". Machine learning systems 210 analyze machine learning inputs 206, and present recommended action 220 (which can include recommendations generated by each of the machine learning models of machine learning systems 210 and their associated confidence levels) to a user by way of, for example, a user interface such as that described in connection with FIG. 10. In the embodiment depicted in FIG. 2B, recommended action 220 represents recommended action result information 225, which identifies, potentially, one or more problem resolutions 280. Problem resolutions 280, in turn, can include, for example, one or more of a guided solution 282 (e.g., information regarding instructions to begin a guided path in in online knowledgebase), a service dispatch 284 (e.g., one or more instructions with regard to starting a dispatch workflow with one or more parts potentially identified), a system assessment alert 285, a soft resolution 287, a diagnostic identification 288 (e.g., which could include instructions to perform one or more troubleshooting steps), and/or information regarding any existing issue 289, among other possible such resolutions. Recommended action result information 225 can identify, also potentially, one or more problems that were not resolved (represented in FIG. 2B by unresolved problems 290).

As noted, one or more of problem resolutions 280 and/or information representing one or more unsolved problems 290, as well as, potentially, performance feedback information 227, or then input to resolution analyzer 230. Resolution analyzer 230 analyzes recommended action result information 225 and performance feedback information—227, and generates feedback 232 and feedback 234 therefrom. Feedback 232 is, as noted, fed back into machine learning systems 210, while feedback 234 is fed back to machine learning inputs 206 via connector "B", it being understood that such feedback provides for positive reinforcement of recommended actions resulting in the resolution of problems. Further, it will be appreciated that such positive reinforcement also tends to deemphasize unsuccessful resolutions, thereby protecting such systems from malicious actors (such faulty information not leading to successful resolutions, and so being deemphasized). Feedback 234 can, for example, be received at and maintained as existing problem information 277 and/or business rule information 278 (or modifications thereto).

Presented below are code snippets used in effecting operation of machine learning systems 210 using a logistic regression technique, described subsequently in connection with FIG. 3.

```
Service Tag
Tag
{
    "lob_desc": "XXXXXXXXX",
    "fmly_desc": "XXXXXXXXX",
    "asst_id": "XXXXXXXXX",
    "brand_desc": "XXXXXXXXX",
    "shipd_dt": "XXXXXXXXX",
    "start_time_utc": "XXXXXXXXX",
}
Support Assistance
{
    "index": 0,
    "asst_id": "XXXXXXXXX",
    "timestamp": "XXXXXXXXX"
    "num_alerts": 0,
    "alert_key": 0,
    "resolutionlevel": 0,
    "gr_okb_page_link": "No data",
    "gr2_message": "No data",
    "sa_message": "No Alerts",
    "kbaf_direct_link": "No data",
    "sln_num": "No data",
}
Keywords
{
    "keywords": [
      "keyboard",
      "key",
      "fall",
      "off"
    ],
    "X_ISP_SR_TITLE": "keyboard key fall off",
    "goodkeyw": 4,
}
```

```
Cluster Model
{
  "cluster": "key - keyboard - off",
}
Error Codes
null
Misc.
{
  "keywords": {
    "X_ISP_SR_TITLE_ORIG": "keyboard keys fell off"
  },
  "hard_solution": {
    "cost": "low"
  }
}
Model Guided_Path
{
  "top5": [
    [
      "Keyboard",
      0.998399138
    ],
    [
      "No Boot",
      0.00011980228
    ],
    [
      "Slow Performance, Lockup And Freeze For Windows 7, 8 And 10",
      0.0000914254342
    ],
    [
      "No Power Laptop",
      0.00007379129
    ],
    [
      "Battery Troubleshooting",
      0.0000727330844
    ]
  ],
  "PredictedLabel": "keyboard",
}
Model Soft
{
  "top5": [
    [
      "Release Flea Power And Restart The System",
      0.224723682
    ],
    [
      "Run SupportAssist",
      0.0623461567
    ],
    [
      "Turn Off Filter Keys",
      0.05025932
    ],
    [
      "Follow Appropriate Local Policy Regarding Physical Damage",
      0.04496418
    ],
    [
      "Reinstall Application",
      0.0430632271
    ]
  ],
  "PredictedLabel": "Release Flea Power And Restart The System",
}
Model Hard
{
  "top5": [
    [
      "Keyboard",
      0.9872117
    ],
    [
      "Touchpad",
      0.00196020841
    ],
    [
      "Motherboard",
      0.00190751068
    ],
    [
      "Lcd",
      0.00150654872
    ],
    [
      "Chassis",
      0.00148514868
    ]
  ],
  "PredictedLabel": "keyboard",
}
Next Best Action
[
  {
    "edit_flg": 0,
    "udt_key_used": 0,
    "path_nba_threshold": 0.3,
    "cost": "{'hard_solutions_0_pred': 'keyboard', 'hard_nba_threshold': 0.3, 'path_nba_threshold': 0.3, 'cost': 13.937835, 'soft_nba_threshold': 0.0, 'cost_api_error': '',
    "actions": "Dispatch Part: Keyboard",
    "fulltext_rank": 0,
    "nba_model": "{ 'top5': [('Dispatch Part: Keyboard', 0.76774, 'hard', 0), ('Follow Guided Path: Keyboard', 0.2260361, 'path', 0), ('Perform The Following Action: Release Flea Power And Restart The System', 0.00174945057, 'soft', 0), ('Dispatch Part: Battery', 0.000269897515, 'hard', 0), ('Follow Guided Path: Windows 7, 8, 10 OS Installation/Restore', 0.000219888287, 'path', 0)],
    'nba_model_api_error': None,
    "hard_nba_threshold": 0.3,
    "udt": "{'udt_api': 'XXXXXXXXXX', 'udt_api_error': '', 'edit_flg': 0, 'udt_key_used': 0, 'actions': ['']}",
    "autolog_rank": 0,
    "path_shortcuts": "{'shortcuts_api_error': '', 'shortcuts_api': 'XXXXXXXXXX'}",
    "soft_nba_threshold": 0,
    "link": "",
    "known_issues": "{'sln_num': [ ], 'rank': [ ], 'known_issues_api_error': '', 'nba_link': [ ], 'nba_text': [ ], 'known_issues_api': 'XXXXXXXXXX', 'index': [ ]}",
    "software_version": "XXXXXXXXXX"
  },
  {
    "edit_flg": 0,
    "udt_key_used": 0,
    "path_nba_threshold": 0.3,
    "cost": "{'hard_solutions_0_pred': 'keyboard', 'hard_nba_threshold': 0.3, 'path_nba_threshold': 0.3, 'cost': 13.937835, 'soft_nba_threshold': 0.0, 'cost_api_error': '', 'cost_api': 'XXXXXXXXXX'}",
    "actions": "Follow Guided Path: Keyboard",
    "fulltext_rank": 0,
    "nba_model": "{'top5': [('Dispatch Part: Keyboard', 0.76774, 'hard', 0), ('Follow Guided Path: Keyboard', 0.2260361, 'path', 0), ('Perform The Following Action: Release Flea Power And Restart The System', 0.00174945057, 'soft', 0), ('Dispatch Part: Battery', 0.000269897515, 'hard', 0), ('Follow Guided Path: Windows 7, 8, 10 OS Installation/Restore', 0.000219888287, 'path', 0)],
    'nba_model_api_error': None, 'nba_model_api': 'XXXXXXXXXX'}",
    "hard_nba_threshold": 0.3,
    "udt": "{'udt_api': 'XXXXXXXXXX', 'udt_api_error': '', 'edit_flg': 0, 'udt_key_used': 0, 'actions': ['']}",
    "autolog_rank": 0,
    "path_shortcuts": "{'shortcuts_api_error': '', 'shortcuts_api': 'XXXXXXXXXX'}",
    "soft_nba_threshold": 0,
    "link": "",
    "known_issues": "{'sln_num': [ ], 'rank': [ ], 'known_issues_api_error': '', 'nba_link': [ ], 'nba_text': [ ], 'known_issues_api': 'XXXXXXXXXX', 'index': [ ]}",
    "software_version": "XXXXXXXXXX"
  },
  {
    "edit_flg": 0,
    "udt_key_used": 0,
```

-continued

```
    "path_nba_threshold": 0.3,
        "cost": "{'hard_solutions_0_pred': 'keyboard',
'hard_nba_threshold': 0.3, 'path_nba_threshold': 0.3, 'cost':
13.937835, 'soft_nba_threshold': 0.0, 'cost_api_error': '',
'cost_api': 'XXXXXXXXXX'}",
        "actions": "Follow Guided Path: No Boot",
        "fulltext_rank": 0,
        "nba_model": "{'top5': [('Dispatch Part: Keyboard', 0.76774,
'hard', 0), ('Follow Guided Path: Keyboard', 0.2260361, 'path', 0) ,
('Perform The Following Action: Release Flea Power And Restart The
System', 0.00174945057, 'soft', 0), ('Dispatch Part: Battery',
0.000269897515, 'hard', 0), ('Follow Guided Path: Windows 7, 8, 10 OS
Installation/Restore', 0.000219888287, 'path', 0)],
'nba_model_api_error': None, 'nba_model_api': 'XXXXXXXXXX'}",
        "hard_nba_threshold": 0.3,
        "udt": "{'udt_api': 'XXXXXXXXXX', 'udt_api_error': '', 'edit_flg':
0, 'udt_key_used': 0, 'actions': [']}",
        "autolog_rank": 0,
        "path_shortcuts": "{'shortcuts_api_error': '', 'shortcuts_api':
'XXXXXXXXXX'}",
        "soft_nba_threshold": 0,
        "link": "",
        "known_issues": "{'sln_num': [ ], 'rank': [ ],
'known_issues_api_error': '', 'nba_link': [ ], 'nba_text': [ ],
'known_issues_api': 'XXXXXXXXXX', 'index': [ ]}",
        "software_version": "XXXXXXXXXX"
    },
    {
        "edit_flg": 0,
        "udt_key_used": 0,
        "path_nba_threshold": 0.3,
        "cost": "{'hard_solutions_0_pred': 'keyboard',
'hard_nba_threshold': 0.3, 'path_nba_threshold': 0.3, 'cost':
13.937835, 'soft_nba_threshold': 0.0, 'cost_api_error': '',
'cost_api': 'XXXXXXXXXX'}",
        "actions": "Follow Guided Path: Slow Performance, Lockup And
Freeze For Windows 7, 8 And 10",
        "fulltext_rank": 0,
        "nba model": "{'top5': [('Dispatch Part: Keyboard', 0.76774,
'hard', 0), ('Follow Guided Path: Keyboard', 0.2260361, 'path', 0),
('Perform The Following Action: Release Flea Power And Restart The
System', 0.00174945057, 'soft', 0), ('Dispatch Part: Battery',
0.000269897515, 'hard', 0), ('Follow Guided Path: Windows 7, 8, 10 OS
Installation/Restore', 0.000219888287, 'path', 0)],
'nba_model_api_error': None, 'nba_model_api': 'XXXXXXXXXX'}",
        "hard_nba_threshold": 0.3,
        "udt": "{'udt_api': 'XXXXXXXXXX', 'udt_api_error': '', 'edit_flg':
0, 'udt_key_used': 0, 'actions': [']}",
        "autolog_rank": 0,
        "path_shortcuts": "{'shortcuts_api_error': '', 'shortcuts_api':
'XXXXXXXXXX'}",
        "soft_nba_threshold": 0,
        "link": "",
        "known_issues": "{'sln_num': [ ], 'rank': [ ],
'known_issues_api_error': '', 'nba_link': [ ], 'nba_text': [ ],
'known_issues_api': 'XXXXXXXXXX', 'index': [ ]}",
    }
]
```

It will be appreciated that, in light of the present disclosure, the variable identifier "N" is used in several instances in various of the figures herein to more simply designate the final element of a series of related or similar elements. The repeated use of such variable identifiers is not meant to imply a correlation between the number of elements in such series. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Figure 3:
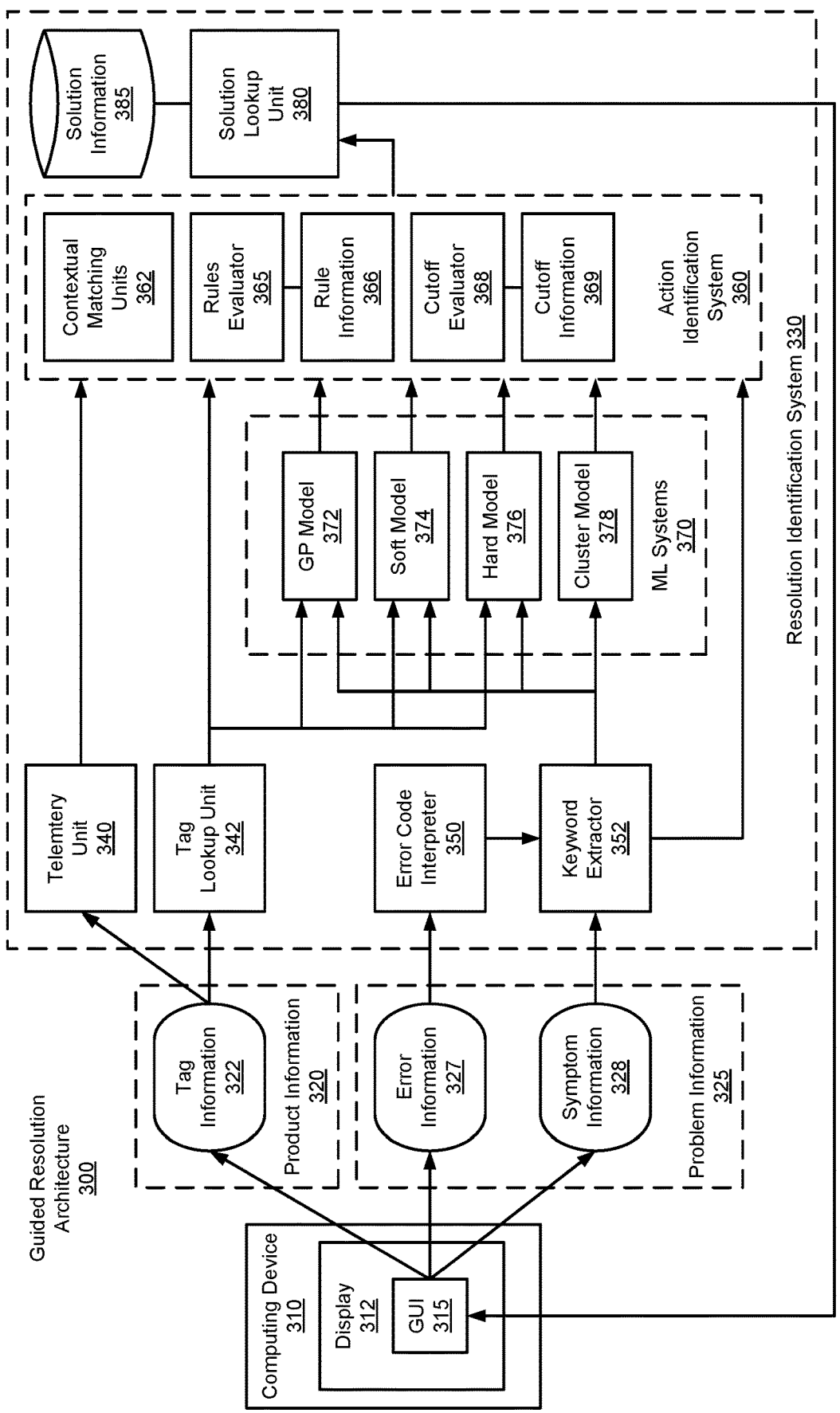
FIG. 3 is a simplified block diagram illustrating an example of a guided resolution architecture, according to some embodiments.

FIG. 3 is a simplified block diagram illustrating an example of a guided resolution architecture, according to some embodiments. FIG. 3 thus depicts a guided resolution architecture 300. Guided resolution architecture 300 includes a computing device 310 (having a display 312 capable of displaying a graphical user interface (GUI; or more simply, a user interface (UI); and depicted in FIG. 3 as a GUI 315)) that facilitates provision of product information 320 and problem information 325 to a resolution identification system 330. Resolution identification system 330 generates one or more actions that can be implemented to resolve a problem, and information regarding which is presented in GUI 315. In certain embodiments, product information 320 can include tag information 322, while in those or other embodiments, problem information 325 can include air information 327 and/or symptom information 328 (the provision of which may depend on the given problem(s) encountered by the user (e.g., customer)).

In certain embodiments, product information 320 (and, in particular, tag information 322) and problem information 325 (and, in particular, error information 327 and/or symptom information 328) are provided to resolution identification system 330 at inputs thereof. That being the case, resolution identification system 330 can include a telemetry unit 340 (e.g., such as "on-the-box" telemetry provided by hardware monitors, software demons, or other such hardware or software module), a tag lookup unit 342, an error code interpreter 350 and a keyword extractor 352, such components receiving the aforementioned information. In particular, telemetry unit 340 gathers information regarding errors, failures, symptoms, and other events experienced by the given product, while tag lookup unit 342 provides information regarding the asset in question to the machine learning and action identification systems (described subsequently).

In operation, telemetry unit 340 and tag lookup unit 342 received tag information 322, while error code interpreter 350 receives error information 327 and keyword extractor 352 receives symptom information 328. Telemetry unit 340 and tag lookup unit 342, as well as keyword extractor 352 provide outputs to an action identification system 360. Action identification system 360, in turn, can include one or more contextual matching units 362, a rules evaluator 365 (which evaluates information received by action identification system 360 using one or more rules maintain in rule information 366), and a cutoff evaluator 368 (which evaluates such inputs with respect to cutoff values maintained in cutoff information 369. The operation of components of action identification system 360 are discussed subsequently.

Tag lookup unit 342 and keyword extractor 352 also provide outputs to machine learning (ML) systems 370. In one embodiment, machine learning systems 370 include a guided path (GP) model 372, a soft model 374, a hard model 376, and a cluster model 378. The operation of components of machine learning systems 370 are discussed subsequently. In such embodiments, information generated by tag lookup unit 342 is presented to GP bottle 372, soft model 374, and hard model 376. Error information 327 is interpreted by error code interpreter 350, and presented to keyword extractor 352, potentially along with symptom information 328. Keyword extractor 352 processes error code information generated by error code interpreter 350 and symptom information 328, and, in a manner similar to tag lookup unit 342, provides its output to GP model 372, soft model 374, and hard model 376. Additionally, keyword extractor 352 provides its output to cluster model 378.

In certain embodiments, it is advantageous for machine learning systems 372 to employ logistic regression, with the various models just described. Logistic regression analysis lends itself to use in classification (either in a binary output, or multiple value output) of the kind contemplated by methods and systems such as those described herein. In the present scenario, logistic regression is useful for classifying potential actions for use in resolving problems, and providing a level of confidence in that regard.

Being a predictive analysis algorithm (and based on the concept of probability), logistic regression is a statistical model that can be used to provide for the classification of potential actions and predict the potential for success of such potential actions in addressing the problem at hand. In regression analysis, logistic regression estimates the parameters of a logistic model (a form of binary regression), using the Sigmoid function to map predictions to probabilities. Mathematically, a binary logistic model has a dependent variable with two possible values (e.g., in the present application, whether a given action will provide the desired resolution), which can be represented by an indicator variable (e.g., with its two possible values are labeled "0" and "1"). In such a logistic regression approach, the log-odds (the logarithm of the odds) for the value labeled "1" is a linear combination of one or more independent variables ("predictors"), such as the aforementioned machine learning analysis inputs; the independent variables can each be a binary variable (two classes, coded by an indicator variable) or a continuous variable (any real value). The corresponding probability of the value labeled "1" can vary between 0 (certainly the value "0") and 1 (certainly the value "1"), hence the labeling; the function that converts log-odds to probability is the logistic function. However, it will be appreciated that various machine learning models, using different sigmoid functions (rather the logistic function) can also be used. It will be appreciated in light of present disclosure that a characteristic of the logistic model is that increasing one of the independent variables multiplicatively scales the odds of the given outcome at a constant rate, with each independent variable having its own parameter; for a binary dependent variable this generalizes the odds ratio.

In embodiments employing a binary logistic regression approach, the logical regression has two levels of the dependent variable; categorical outputs with more than two values can be modeled by multinomial logistic regression, and if the multiple categories are ordered, by ordinal logistic regression (e.g., the proportional odds ordinal logistic model). The various models described herein form the basis of classifiers for the various possible actions. Using the logistic regression approach as the basis for a classifier, can be effected, for instance, by choosing a cutoff value and classifying inputs with probability greater than the cutoff as one class, below the cutoff as the other, and in so doing, implement a binary classifier.

As noted, ML systems 370 can be implemented with three different machine learning models, which predict the probability of correspondingly different types of solutions (those being (1) following a guided path (GP model 372), (2) performing a soft solution (soft model 374), or (3) dispatching a hard solution (hard model 376)). In each case, the models take, at least in part inputs from the tag information and keywords established from the user input. The output of these models is a series of possible solutions and probabilities. For each model, the probabilities indicate if the given problem was solved by that type of solution in the past, how often that particular solution was selected in the past, and other such information. For example, for hard drive problems in a computer system, hard model 376 might indicate, for situations in which hard drive problems were solved by hard fixes, 87% of the time, the hard fix was replacing the hard drive. This probability is represented as the "Confidence" listed in the user interface.

For the three aforementioned machine learning models (predicting guided paths, soft solutions, and hard solutions), the logistic regression technique described earlier can be employed, with different historical data sets being used for each of the machine learning models employed. In one embodiment, each of the machine learning models uses historical information that includes product information such as a service tag and problem information such as keywords. For each input in such historical data, the machine learning model determines the correlation between that input any particular outcome. Once the correlations between the historical inputs are calculated, the machine learning model can use that information to determine the likelihood of a given outcome for a new set of inputs. For example, the keyword "hard drive" might be highly associated with the "Hard Drive Troubleshooting" guided path. However, "detect" can be associated with many types of issues, so such a keyword would have a much weaker correlation to "Hard Drive Troubleshooting". The machine learning model sums these weighted inputs and uses the results to determine which of the available alternatives is the most likely.

The machine learning models' analysis of the machine learning input data produces information regarding possible likely solutions (examples of which are shown in the individual model predictions display of the user interface, described subsequently in connection with FIG. 10). For each machine learning model, data-driven thresholds are used to define high, medium, and low confidence levels. Based on the confidence levels of those outputs, and indications with regard to the applicable business rules (e.g., a hard solution involving a high-cost part might be indicated as being less attractive), the actions recommended by the machine learning models are ranked. This ranking leads to the recommended action presented in a recommended action description field of the user interface (as is described subsequently in connection with FIG. 10).

As will be appreciated, use of a machine learning model typically involves the training of its machine learning system. Presented below is sample code (using the Python programming language) that can be used to train machine learning logistic regression models in certain embodiments of systems such as those disclosed herein. In this example, the function "train_lin_reg_tree_all" takes as its input a dataframe with columns representing features used to predict output category, (e.g., in the example presented a guided path article title). For example, a logistic regression model can be trained by calling a logistic regression function ("perf_logistic_regression").

```
def train_lin_reg_tree_all (train_ds):
#convert columns used to predict to category
train_ds["auto_log_article_title"] =
train_ds["auto_log_article_title"].astype ("category")
train_ds["brand_desc"] = train_ds["brand_desc"].astype("category")
train_ds["lob_desc"] = train_ds["lob_desc"].astype("category")
train_ds["fmly_desc"] = train_ds["fmly_desc"].astype("category")
#global train
auto_rec_model = perf_logistic_regression (formula =
    "auto_log_article_title ~ srk + \fmly_desc + lob_desc +
    brand_desc"
 ,data = train_ds
 ,method = "multiClass"
 ,l1_weight = .5
 ,l2_weight = .5
 ,report_progress = 2
 ,verbose = 2
 ,show_training_stats = True
```

```
,ml_transforms = [
    featurize_text (cols = dict (srk = "input_data")
        ,stopwords_remover = None
        ,keep_punctuations = False
        ,keep_numbers = False
        ,case = "Lower"
        ,word_feature_extractor = n_gram (ngram_length=2,
            weighting="TfIdf")
        ,vector_normalizer = None)
    ,mutualinformation_select (cols = ["srk"]
        ,label="auto_log_article_title", num_features_to_keep =
            10000)
    ]
)
return auto_rec_model
# Call the function to train model
auto_rec_tree_model_all = train_lin_reg_tree_all(X_train)
```

GP model 372, soft model 374, hard model 376, and cluster model 378 generate one or more recommended actions (also referred to herein as "model outputs"), intended to address the problem at hand. As noted, the components of action identification system 360 receive information from telemetry unit 340, tag lookup unit 342, and keyword extractor 352 directly, and also receive the results of the machine learning analysis performed by GP model 372, soft model 374, hard model 376, and cluster model 378. As noted, rules evaluator 365 of action identification system 360, using rule information 366, can affect the outputs of machine learning systems 370, in order to give effect to various business considerations that may affect the desirability of a given one of the recommended actions generated by machine learning systems 370. In comparable fashion, as also described, cutoff evaluator 368, using cutoff information 369, can be used to affect classification of the outputs of machine learning systems 370 by allowing a cutoff value to be chosen and using that cutoff value to classify inputs (e.g., by classify inputs with a probability greater than the cutoff as one class, and below the cut off as another class, when logistic regression is used implement a binary classifier). Further still, contextual matching units 362 can be used to analyze information received from telemetry unit 340, tag lookup unit 342, and the outputs of machine learning systems 370 in assisting with providing information to solution lookup unit 380, in identifying preferred solutions. Action identification system 360, presents one or more recommended actions to a solution lookup unit 380, which searches for and identifies information relevant to the proposed solution in solution information 385. Solution lookup unit 380 then presents this information to a user in, for example, GUI 315.

While not required, certain embodiments will provide various platforms and/or services to support the aforementioned functionalities and the deployment thereof in a cloud environment. Such an architecture can be referred to as, for example, a cloud-native application architecture, which provides for development by way of a platform that abstracts underlying infrastructure. In so doing, methods and systems such as those described herein are better able to focus on the creation and management of the services thus supported.

Figure 4:
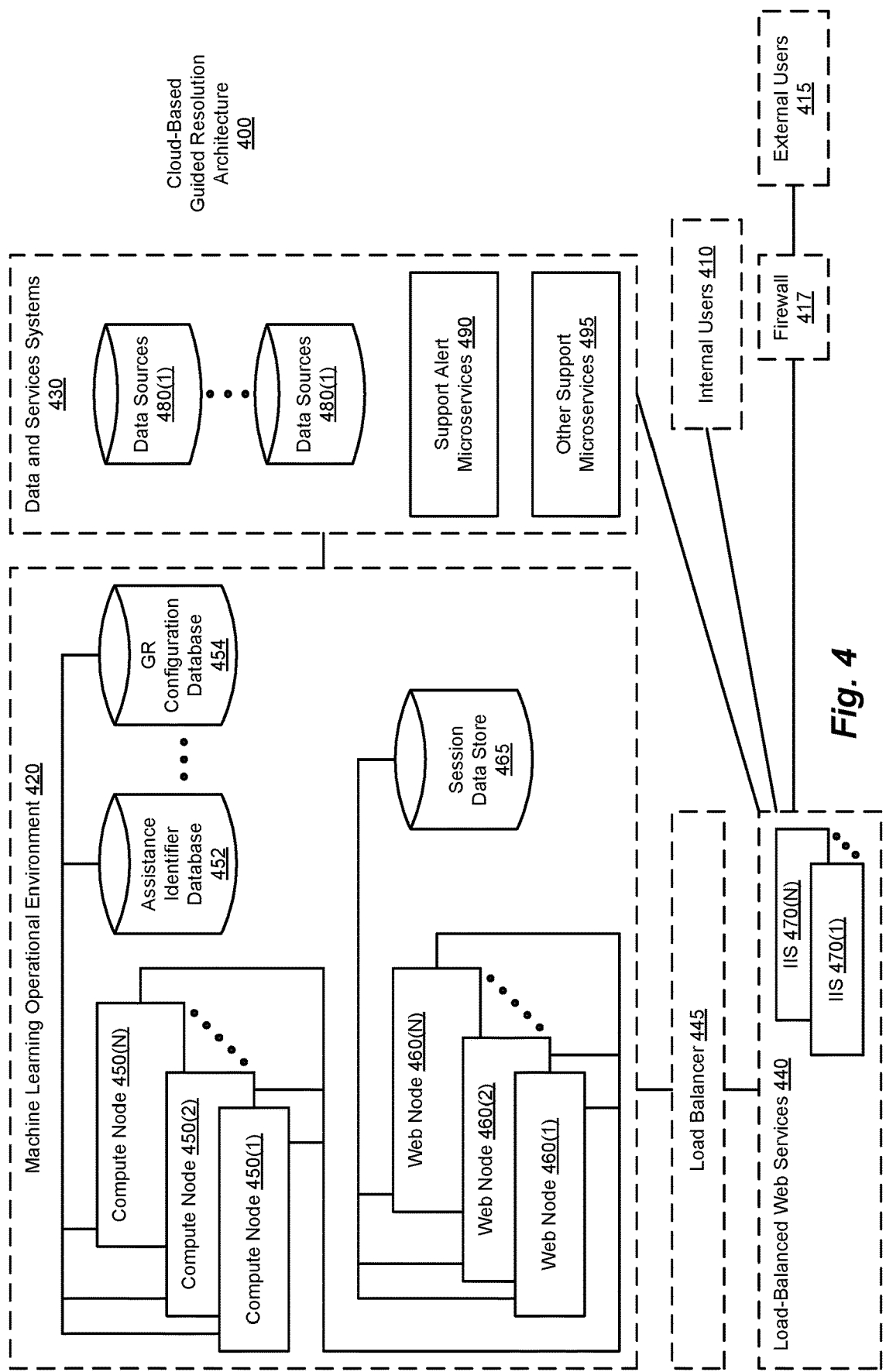
FIG. 4 is a simplified block diagram illustrating an example of a cloud-based guided resolution architecture, according to some embodiments.

FIG. 4 is a simplified block diagram illustrating an example of a cloud-based guided resolution architecture employing such techniques, according to some embodiments. As will be appreciated in light of the present disclosure, a guided resolution architecture such as guided resolution architecture 300 can be implemented in a data center or other cloud-based computing environment. That being the case, a cloud-based guided resolution architecture 400 is depicted in FIG. 4. Cloud-based guided resolution architecture 400, in the embodiment depicted in FIG. 4, provides guided resolution functionalities such as that described herein to one or more internal users 410 and/or one or more external users 415 (e.g., as by a firewall 417). Components of cloud-based guided resolution architecture 400 depicted in FIG. 4 include a machine learning operational environment 420 that receives information from data and services systems 430, and makes available such functionality to internal users 410 and external users 415 by way of load-balanced web services 440 via a connection there to through a load balancer 445 (which provides for access to machine learning operational environment 420 by way of guided resolution engine entry, and can be implemented by, for example, one or more load-balancing appliances).

Machine learning operational environment 420 provides functionalities such as that provided via guided resolution architecture 300 through its support of various components. These components include some number of compute nodes (depicted in FIG. 4 as compute nodes 450(1)-(N), in the aggregate compute nodes 450) that access a number of databases, including an assistance identifier database 452 and a guided resolution configuration database 454. In turn, compute nodes 450 support functionality provided via a number of web nodes (depicted in FIG. 4 as web nodes 460(1)-(N), in the aggregate web nodes 460), which access a session data store 465.

Internal users 410 and/or external users 415, as noted, access the functionalities provided by the components of machine learning operational environment 420 via load-balanced web services 440, which, in turn, access the components of machine learning operational environment 420 via load balancer 445. In support of such access, the functionality provided by load-balanced web services 440 is supported by a number of Internet information servers (IIS; depicted in FIG. 4 as IIS 470(1)-(N), and referred to in the aggregate as IIS 470).

In support of the functionalities provided by the components of machine learning operational environment 420, such components access the components of data and services systems 430. To that end, data and services systems 430 maintain a number of data sources (depicted in FIG. 4 as data sources 480(1)-(N), and referred to in the aggregate as data sources 480). Among the services provided by data and services systems 430 are telemetry microservices 490 (e.g., such as an "on-the-box" telemetry microservices, in the manner of the telemetry modules described earlier) and other support microservices 495.

Example Processes for Guided Resolution Employing Machine Learning

Figure 5:
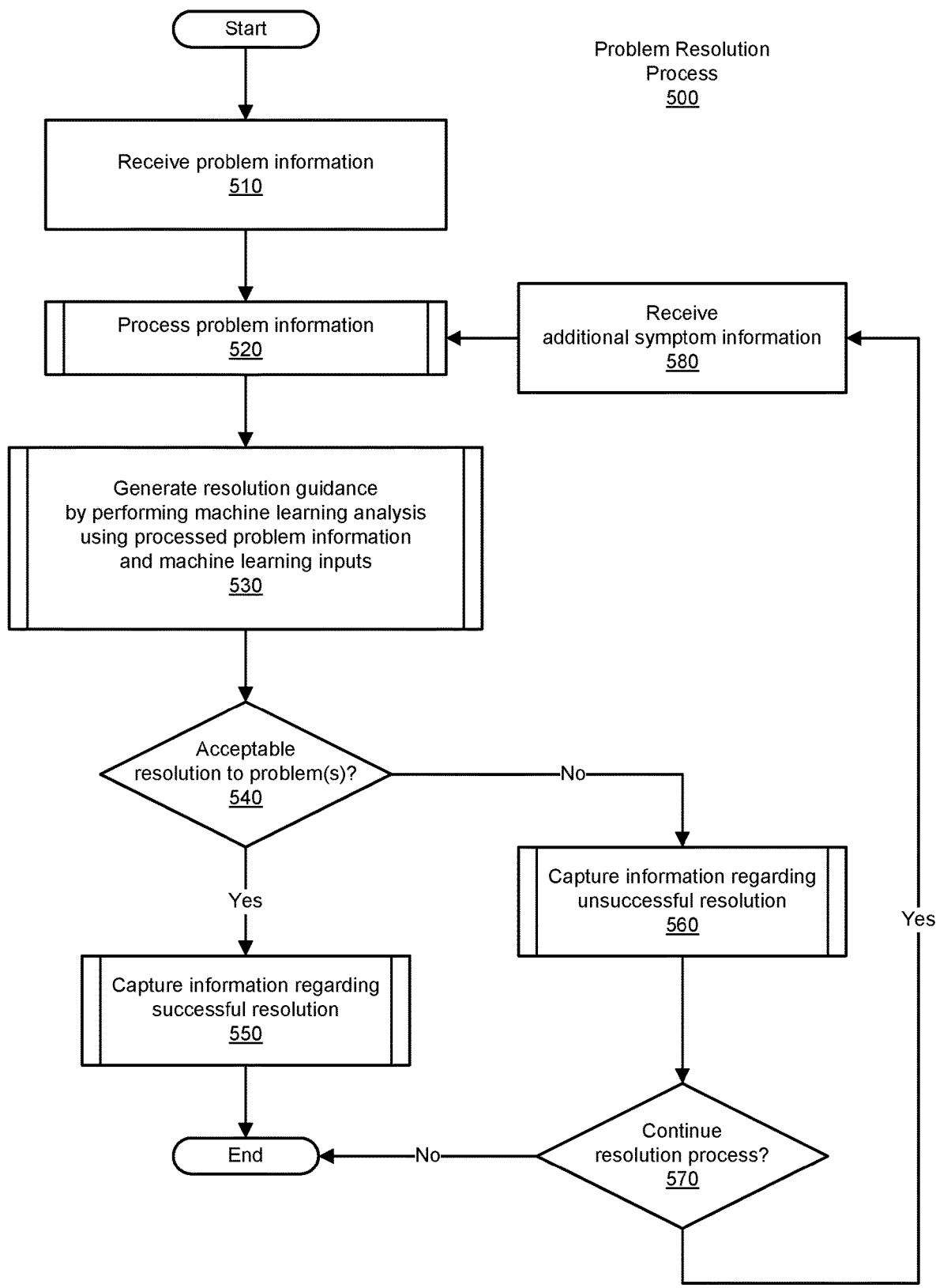
FIG. 5 is a simplified flow diagram illustrating an example of a problem resolution process, according to some embodiments.

FIG. 5 is a simplified flow diagram illustrating an example of a problem resolution process, according to some embodiments. FIG. 5 thus depicts a problem resolution process 500. Problem resolution process 500 begins with receipt of problem information (e.g., at data processing and analytics systems of a resolution determination architecture) (510). Examples of such problem information and the aforementioned processing are given in connection with, for example, the discussion of FIGS. 2A and 2B, previously. Such problem information is then processed (e.g., as by the previously-described data processing and analytics systems) (520). A more detailed discussion of such processing is provided in connection with the example process presented in FIG. 6, subsequently.

Using the processed problem information, resolution guidance (e.g., in the form of one or more actions that can be taken to address the problem at hand, for example) is then generated by performing machine learning analysis using the processed problem information, as well as, potentially, other machine learning inputs (530). A more detailed discussion of such machine learning analysis is provided in connection with the example process presented in FIG. 7, subsequently.

A determination is then made as to whether the proposed actions adequately address the problem at hand, and so provide an acceptable resolution to the problem(s) (540). In the case in which the problem(s) is (are) resolved satisfactorily, information regarding the successful resolution of the problem is captured (e.g., as by the resolution analyzer described earlier in connection with FIG. 2B) (550). Such successful resolutions include those presented earlier as part of problem resolutions related to a given recommended action, and so include, for example, problem resolution such as guided solutions, service dispatches, system assessment alerts, soft resolutions, diagnostic identifications, and/or the identification of existing issues, among other such possibilities. A more detailed discussion of such successful resolution capture is provided in connection with the example process presented in FIG. 8, subsequently. Problem resolution process 500 then concludes.

However, in the case in which the problem(s) at hand are not satisfactorily resolved, problem resolution process 500 proceeds with the capturing of information regarding the unsuccessful resolution thereof (560). Such unsuccessful resolutions include those presented earlier as part of the unresolved problems depicted as part of the recommended action result information described in connection with FIG. 2B. A more detailed discussion of such unsuccessful resolution capture is provided in connection with the example process presented in FIG. 9, subsequently. A determination is then made as to whether problem resolution process 500 is to be continued (570). If further analysis is to be performed with respect to the problem at hand, problem resolution process 500 proceeds to iterate, potentially receiving additional symptom and/or error (or other) information (580), and proceeding to further processing of the available problem information (520). Problem resolution process 500 can continue until such time as a satisfactory resolution is achieved, or no such resolution can be determined. Problem resolution process 500 then concludes.

Figure 6:
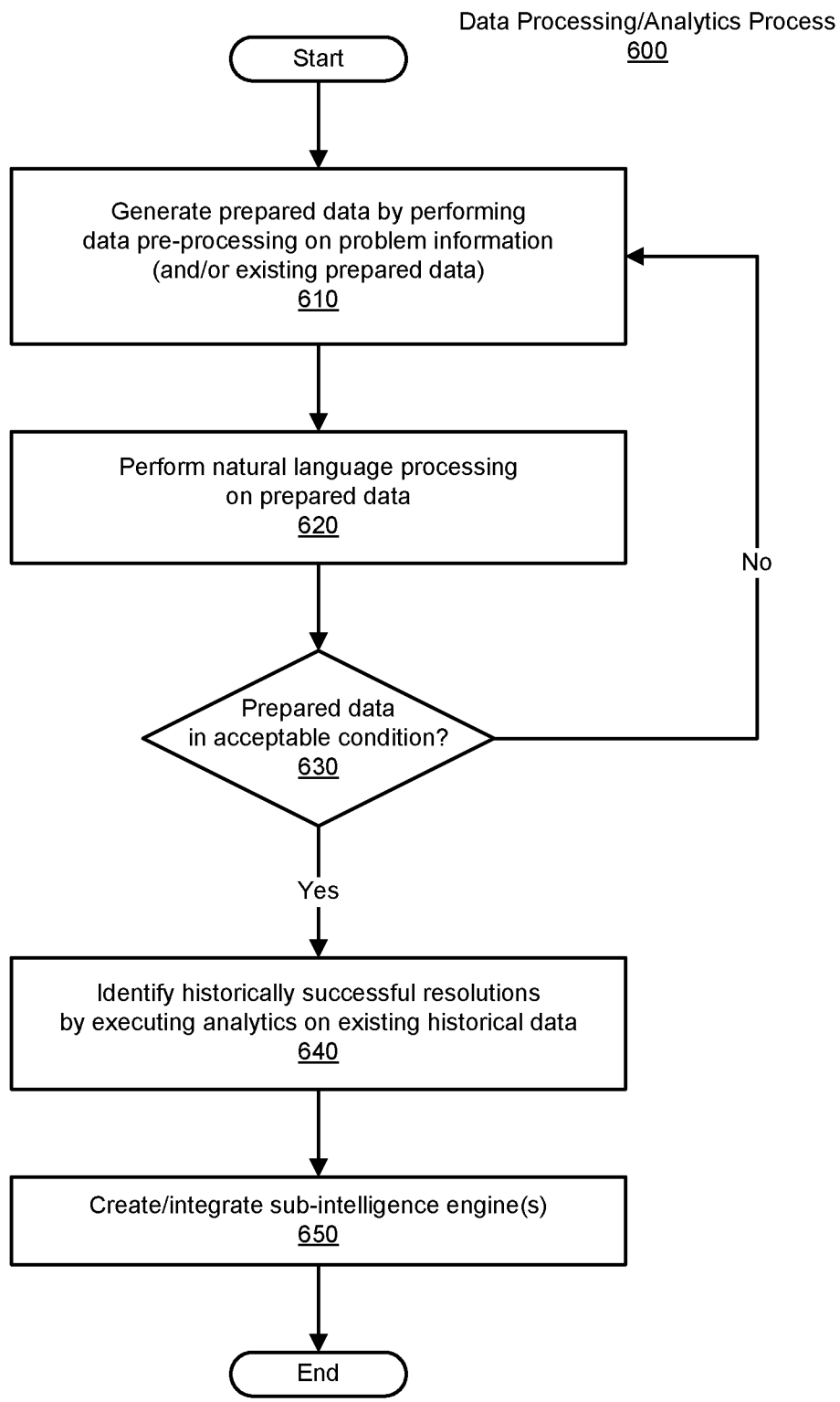
FIG. 6 is a simplified flow diagram illustrating an example of a data intake process, according to some embodiments.

FIG. 6 is a simplified flow diagram illustrating an example of a data intake process, according to some embodiments. As noted in connection with problem resolution process 500, FIG. 6 depicts example operations that can be performed in performing data intake processing, and so depicts a data processing/analytics process 600. Data processing/analytics process 600 begins with the generation of prepared data (610). The generation of prepared data, discussed previously in connection with FIG. 2A, can include, for example, performing data preprocessing on problem information, as well as performing such data preprocessing on existing prepared data (subsequent to natural language processing and/or other subsequent processing). Natural language processing is then performed on the prepared data (620).

A determination is then made as to whether the prepared data (i.e., the problem information thus processed) is in a condition acceptable for use as the machine learning inputs described earlier) (630). In the case in which the prepared data is not yet in an acceptable condition, data processing/analytics process 600 iterates to the performance of additional data preprocessing thereon (610).

Once the prepared data is in an acceptable state, data processing/analytics process 600 proceeds with the identification of historically successful resolutions (640). Such identification can be accomplished, for example, by executing analytics on existing historical data. One or more sub-intelligence engines are then created and integrated (650). Data processing/analytics process 600 then concludes.

Figure 7:
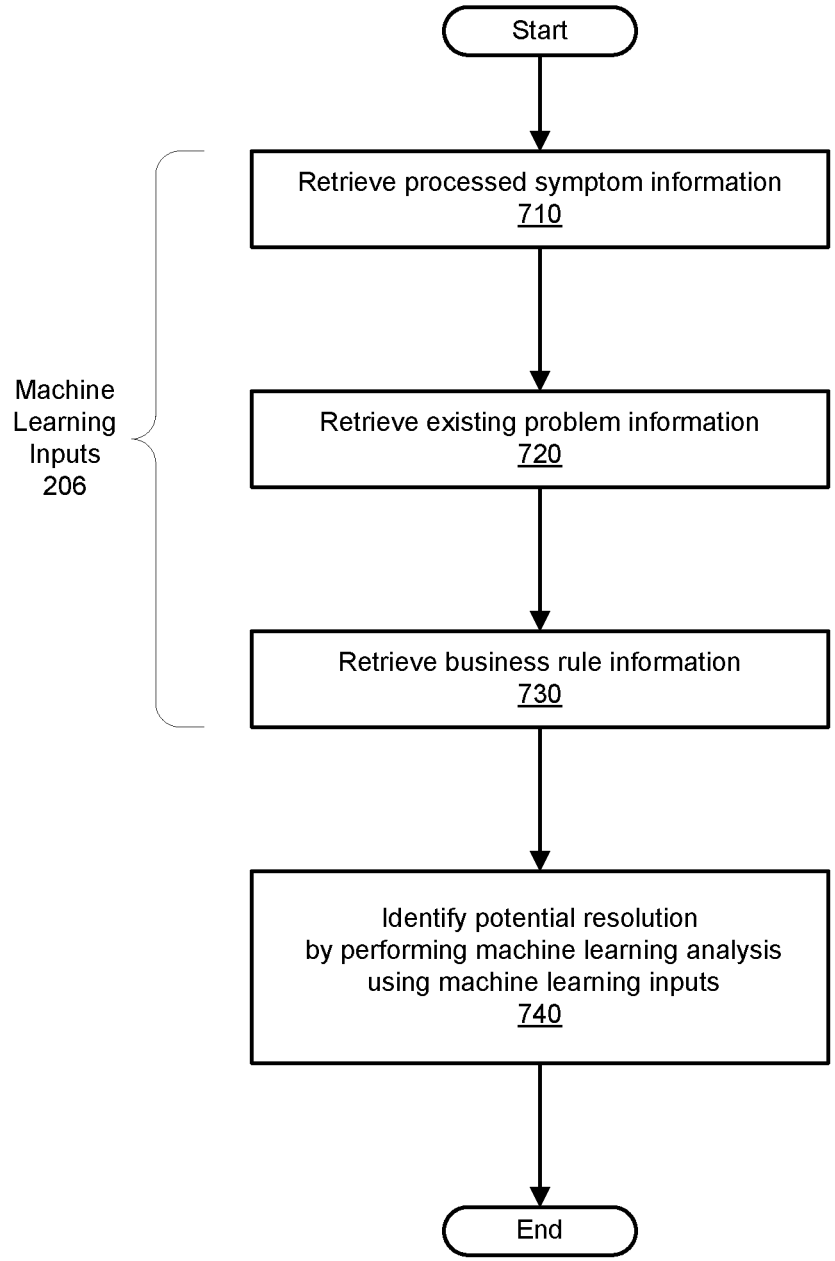
FIG. 7 is a simplified flow diagram illustrating an example of a machine learning analysis process, according to some embodiments.

FIG. 7 is a simplified flow diagram illustrating an example of a machine learning analysis process, according to some embodiments. As noted in connection with problem resolution process 500, FIG. 7 depicts a machine learning analysis process 700. Machine learning analysis process 700 begins with the retrieval of processed symptom information (710). Also retrieved are existing problem information and business role information (720 and 730). Such symptom information, problem information, and business rule information, as well as other types of information, are representative of machine learning inputs 206, as described in connection with FIG. 2A. One or more actions, intended to provide a potential resolution to the problem at hand, are then identified by performing machine learning analysis of the machine learning inputs (740). Machine learning analysis process 700 then concludes.

Figure 8:
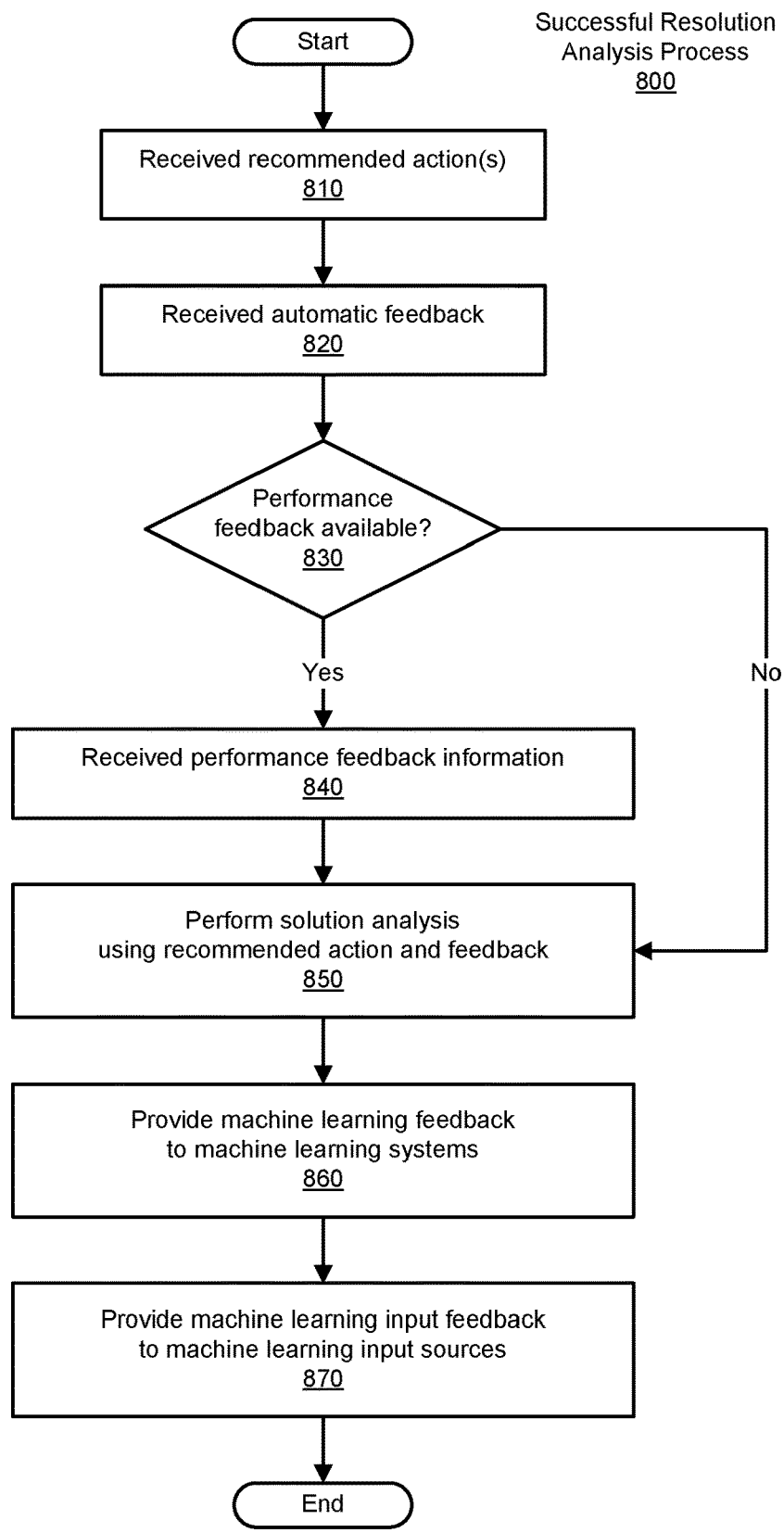
FIG. 8 is a simplified flow diagram illustrating an example of a successful resolution analysis process, according to some embodiments.

FIG. 8 is a simplified flow diagram illustrating an example of a successful resolution analysis process, according to some embodiments. As noted in connection with problem resolution process 500, FIG. 8 depicts a successful resolution analysis process 800. Successful resolution analysis process 800 begins with the receipt of one or more recommended actions (810). Additionally, automatic feedback can be received (820). Such automatic feedback can include information automatically sent or received (e.g., as by telemetry from a computing device, sent by the computing device or a device associated therewith, without the need for operator intervention).

A determination is then made as to whether performance feedback is available (830). If such performance feedback is available, the relevant performance feedback information is received (840). Upon receipt of the performance feedback information (or if such performance feedback information is not available), solution analysis performed using information regarding the recommended action(s) and, if received, automatic feedback and performance feedback (850). At this juncture, successful resolution analysis process 800 provides machine learning feedback thus generated to the machine learning systems (860). Similarly, machine learning input feedback thus generated is provided to one or more of the machine learning input sources (870). Successful resolution analysis process 800 then concludes.

Figure 9:
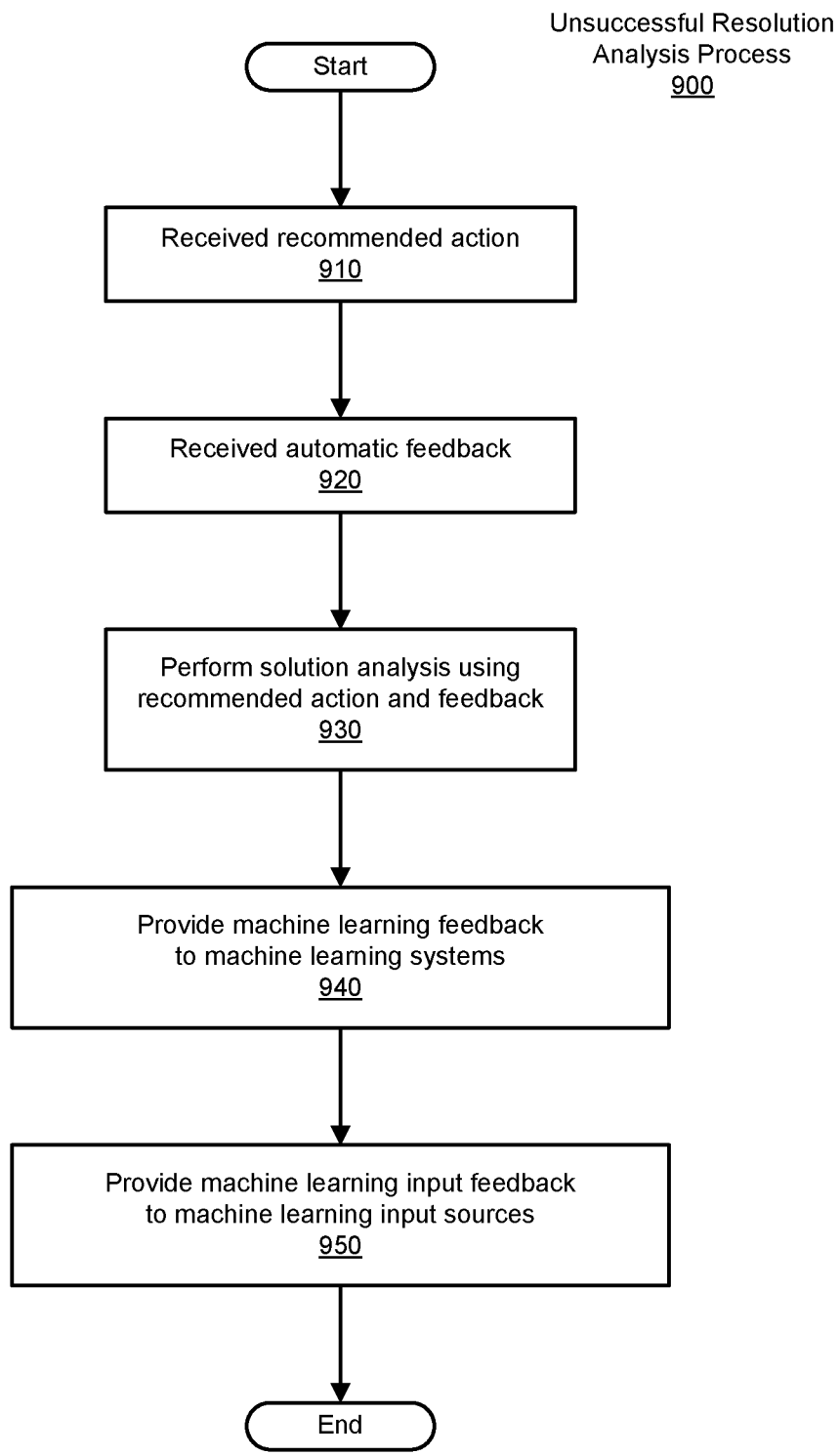
FIG. 9 is a simplified flow diagram illustrating an example of an unsuccessful resolution analysis process, according to some embodiments.

FIG. 9 is a simplified flow diagram illustrating an example of an unsuccessful resolution analysis process, according to some embodiments. As noted in connection with problem resolution process 500, FIG. 9 depicts an unsuccessful resolution analysis process 900. Unsuccessful resolution analysis process 900 begins with the receipt of one or more recommended actions (910). Additionally, automatic feedback can be received (920). As before, such automatic feedback can include information automatically sent or received (e.g., as by telemetry from a computing device, sent by the computing device or a device associated therewith, without the need for operator intervention). Solution analysis is then performed using information regarding the recommended action(s) and, if received, automatic feedback (930). At this juncture, unsuccessful resolution analysis process 900 provides machine learning feedback thus generated to the machine learning systems (940). Similarly, machine learning input feedback thus generated is provided to one or more of the machine learning input sources (950). Unsuccessful resolution analysis process 900 then concludes.

Example Guided Resolution User Interface

Figure 10:
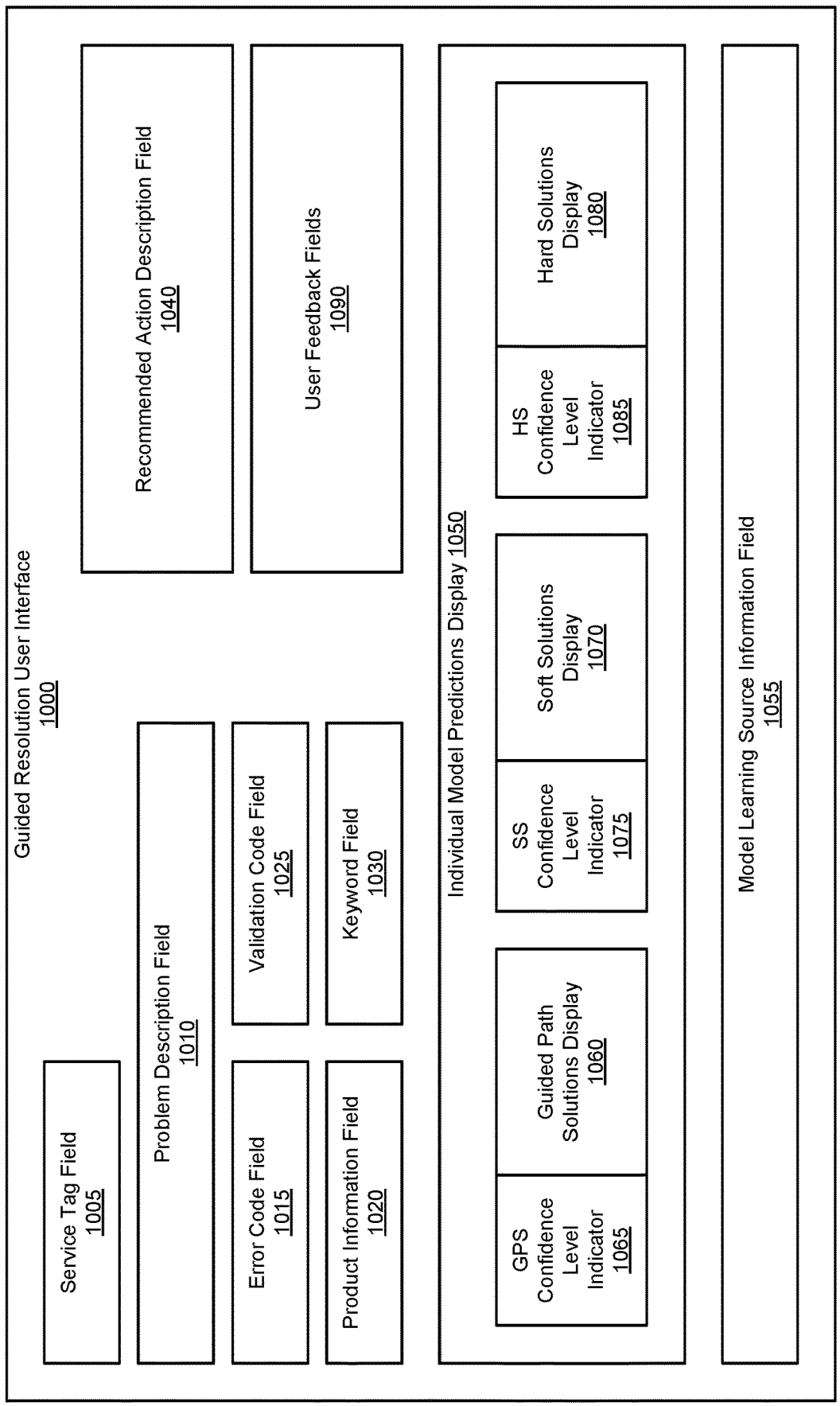
FIG. 10 is a simplified block diagram illustrating an example of a guided resolution user interface, according to some embodiments.

FIG. 10 is a simplified block diagram illustrating an example of a guided resolution user interface, according to some embodiments. FIG. 10 thus depicts a guided resolution user interface 1000, which serves as an example of, for example, GUI 315 of FIG. 3. Guided resolution user interface 1000 can include a number of components (screen elements). As depicted in FIG. 10, guided resolution user interface provides for the entry of a service tag in a service tag field 1005 and problem information in a problem description field 1010. Such a service tag and problem information are comparable to the information described earlier herein. Also available for entry is an error code (by way of an error code field 1015), additional product information (by way of a product information field 1020), and a validation code (e.g., as for validation of authorized use of customer service (which might be on a per-user basis or a per-product basis, for example), by way of a validation code field 1025). Further, guided resolution user interface 1000 also provides for the entry of keywords (as might be used for searching for certain subjects), by way of a keyword field 1030.

Also in the manner depicted in FIG. 3, guided resolution user interface 1000 provides for the presentation of the results of the machine learning analysis performed. Such information can be presented in a recommended action description field 1040, as well as in an individual model predictions display 1050. As can be seen in FIG. 3, below individual model predictions display 1050, a model learning source information field 1055 is shown. In addition to the recommendation information and individual model predictions presented in recommended action description field 1040 and model predictions display 1050, respectively, model learning source information field 1055 can also present the user (e.g., an end-user, a customer service representative, or other person) with information regarding one or more of the sources of information used by the machine learning models in arriving at the aforementioned recommendation information and individual model predictions. Such model learning information sources can include information regarding contacts, service personnel dispatches, replacement parts and/or equipment, information regarding successful resolutions, telemetry alerts, known issues in such situations (or other relevant situations), information regarding user feedback, and other such sources of information as may be used by the machine learning models in question.

As will be further appreciated in light of the present disclosure, the recommended action(s) presented in recommended action description field 1040 can be arrived at by the machine learning analysis performed, through the combination of machine learning outputs generated by a number of machine learning models. Examples of such various machine learning outputs are presented as elements of individual model predictions display 1050. That being the case, individual model predictions display 1050 includes displays for the previously-described guided path model, soft model, and hard model. For each, a confidence level indicator is provided, as is a listing of top solutions generated thereby. Individual model predictions display 1050 thus includes a guided path solutions display 1060 (and its associated GPS confidence level indicator 1065), a soft solutions display 1070 (and its associated SS confidence level indicator 1075), and a hard solutions display 1080 (and its associated HS confidence level indicator 1085). As is also described in connection with FIG. 3, one or more user feedback fields 1090 can be provided to allow a user to input their feedback as to the acceptability of the resolution provided by the actions presented in recommended action description field 1040 and/or one or more of the solutions displayed in individual model predictions display 1050 (as noted in connection with performance feedback information 227 of FIG. 2B, as well as various of the foregoing flow diagrams).

Example Computing and Network Environments

As shown above, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 11 and 12.

Figure 11:
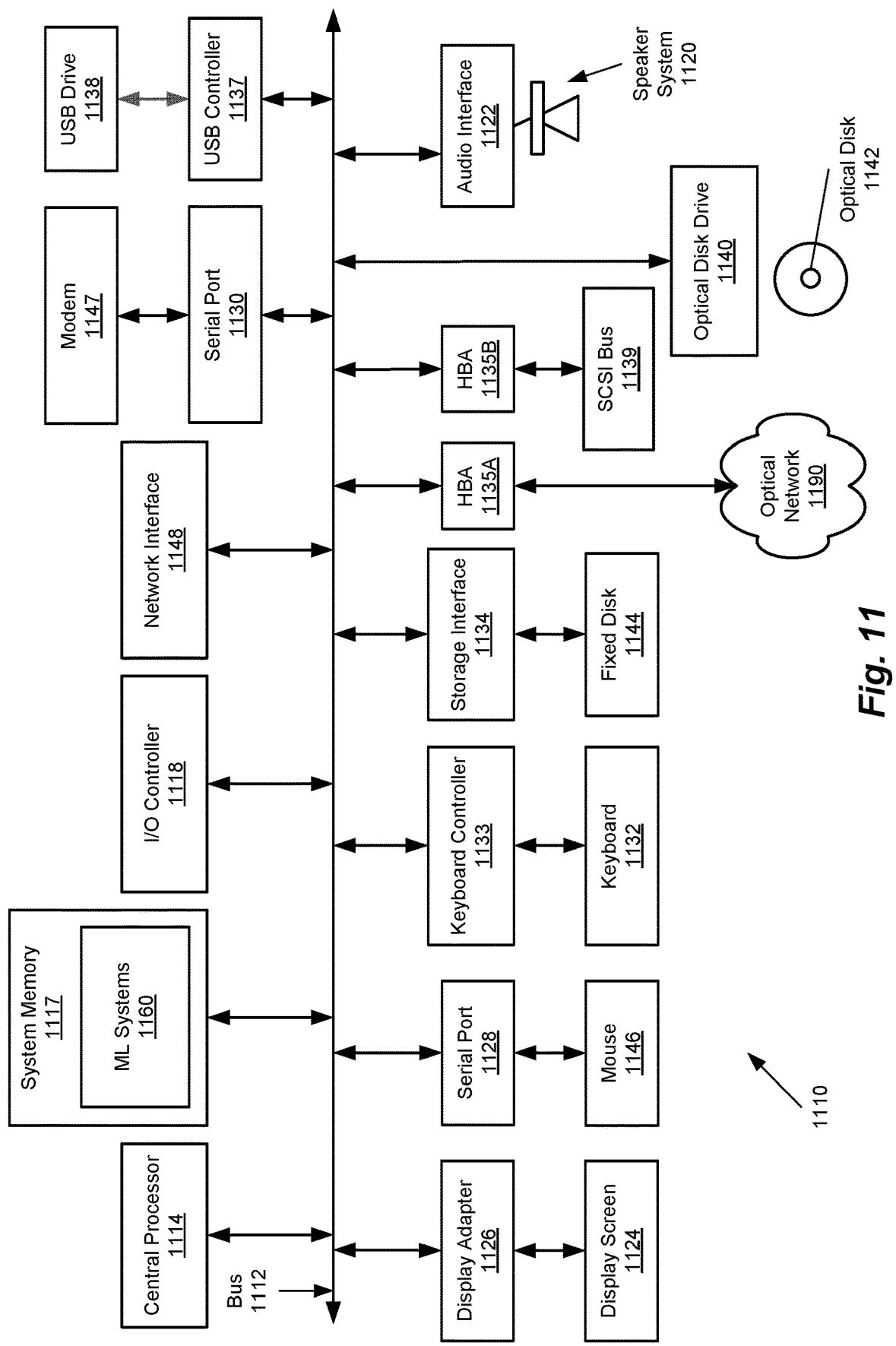
FIG. 11 illustrates an example configuration of a computing device that can be used to implement the systems and techniques described herein.

FIG. 11 depicts a block diagram of a computer system 1110 suitable for implementing aspects of the systems described herein, and so can be viewed as an example of a computing device supporting a microservice production management server, for example. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126 (and so capable of presenting microservice dependency visualization data such as microservice dependency visualization data 225 as visualization 1000 in FIG. 10), serial ports 1128 and 1130, a keyboard 1132 (interfaced with a keyboard controller 1133), a storage interface 1134, a USB controller 1137 operative to receive a USB drive 1138, a host bus adapter (HBA) interface card 1135A operative to connect with a optical network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a universal serial bus (USB) controller 1137, or other computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 is readily known in the art and is not discussed in detail in this application. Code to implement portions of the systems described herein can be stored in computer-readable storage media such as one or more of system memory 1117, fixed disk 1144, optical disk 1142, or floppy disk 1138. The operating system provided on computer system 1110 may be WINDOWS, UNIX, LINUX, IOS, or other operating system. To this end, system memory 1117 is depicted in FIG. 11 as storing a machine learning system 1160, in the manner of the machine learning systems discussed in connection with FIGS. 2B and 3, as well as elsewhere, for example.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
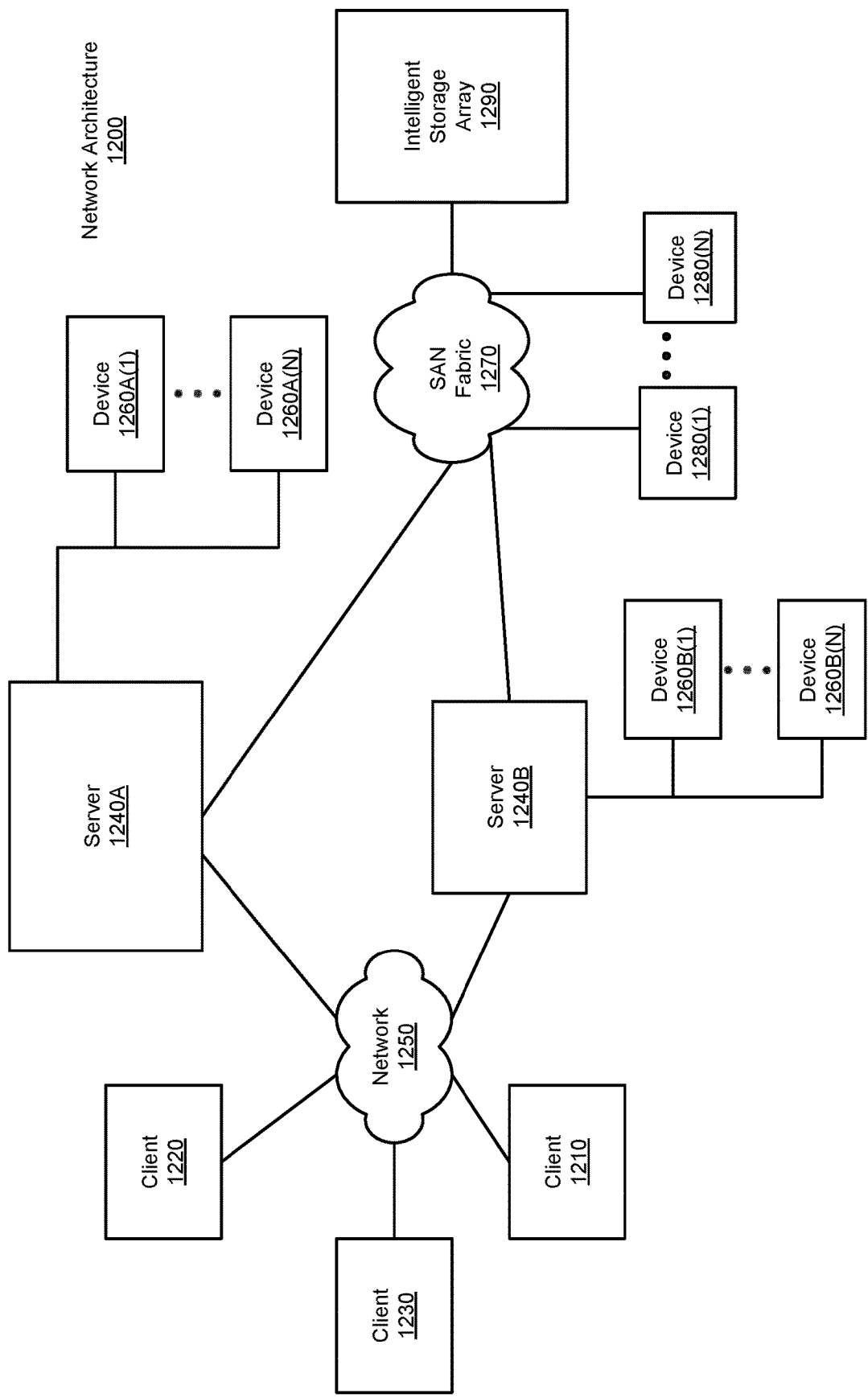
FIG. 12 illustrates an example configuration of a network architecture in which the systems and techniques described herein can be implemented.

FIG. 12 is a block diagram depicting a network architecture 1200 in which client systems 1210, 1220 and 1230, as well as storage servers 1240A and 1240B (any of which can be implemented using computer system 1210), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation. SAN fabric 1270 supports access to storage devices 1280(1)-(N) by storage servers 1240A and 1240B, and so by client systems 1210, 1220 and 1230 via network 1250. An intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving problem information from a user interface, wherein
the problem information is received at a resolution identification system, and
the problem information describes one or more characteristics of a problem;
receiving product information at the resolution identification system, wherein
the product information describes one or more characteristics of a product;
training a machine learning system using a logistic regression function;
iteratively performing preprocessing of the problem information until the preprocessed problem information is determined to be in an acceptable level of accuracy as input to the machine learning system, wherein the preprocessing comprises term frequency-inverse document frequency analysis;
performing machine learning analysis of the problem information and the product information, wherein
the machine learning analysis produces one or more model outputs,
the machine learning analysis is performed by the machine learning system of the resolution identification system,
the machine learning analysis is performed using one or more machine learning models, wherein at least one of the one or more machine learning models is trained as a logistic regression model, and
each of the one or more machine learning models produces a corresponding one of the one or more model outputs, wherein at least one of the one or more machine learning models classifies the problem information as a problem type, wherein the one or more machine learning models comprises a guided path model, a soft model and a hard model and wherein the one or more model outputs comprises a guided path solution, a soft solution and a hard solution, wherein the one or more model outputs is associated with a respective guided path solution display, software solution display and hard solution display;
updating business rule information based on the problem type;
generating resolution information by performing an action identification operation using the one or more model outputs; and
outputting the resolution information from the resolution identification system, wherein
the resolution information is output to the user interface, wherein the user interface comprises an individual model predictions display comprising the guided path solution display rendering the guided path solution and a guided path solution confidence level indicator, the software solution display rendering the soft solution and a software solution confidence level indicator, and the hard solution display rendering the hard solution and a hard solution confidence level indicator, and wherein the user interface comprises at least one user feedback field accepting input associated with the resolution information that is outputted by the individual model predictions display.

2. The method of claim 1, wherein the product information comprises tag information for a product.

3. The method of claim 2, wherein the problem information comprises at least one of error information regarding an error experienced in operation of the product, or symptom information regarding a symptom exhibited by the product in the operation of the product.

4. The method of claim 1, further comprising:
retrieving one or more system attributes for a product identified by the product information, and
retrieving a support history for the product.

5. The method of claim 1, further comprising:
performing an outcome analysis, wherein the outcome analysis is based, at least in part, on the resolution information, the machine learning analysis is performed by one or more machine learning systems of the resolution identification system, and a result of the outcome analysis is fed back to the one or more machine learning systems.

6. The method of claim 1, further comprising:
performing data processing on the problem information, wherein the data processing comprises generating prepared data by performing a data cleansing operation on the problem information, and performing natural language processing on the prepared data.

7. The method of claim 6, wherein the performing data processing further comprises:
identifying one or more historically successful resolutions, wherein
the one or more historically successful resolutions are identified by analyzing existing historical data; and
creating a sub-intelligence engine, wherein the sub-intelligence engine is created using a portion of the problem information.

8. The method of claim 1, wherein the one or more machine learning models comprise at least one of:
a guided path model,
a soft model,
a hard model, or
a cluster model.

9. The method of claim 1, further comprising:
generating a machine learning input to the one or more machine learning models, wherein the problem information comprises error information, and symptom information, and the machine learning input is generated by generating error code information by performing error code interpretation on the error information, and performing keyword extraction on the error code information and the symptom information.

10. The method of claim 9, further comprising:
performing an outcome analysis, wherein the machine learning input is one of a plurality of machine learning inputs, the plurality of machine learning inputs comprise existing problem information, and the business rule information, the outcome analysis is based, at least in part, on the resolution information, the machine learning analysis is performed by one or more machine learning systems of the resolution identification system, and results of the outcome analysis are fed back to the existing problem information and the business rule information.

11. A non-transitory computer-readable storage medium comprising program instructions, which, when executed by one or more processors of a computing system, perform a method comprising:
receiving problem information from a user interface, wherein
the problem information is received at a resolution identification system, and
the problem information describes one or more characteristics of a problem;
receiving product information at the resolution identification system, wherein
the product information describes one or more characteristics of a product;
training a machine learning system using a logistic regression function;
iteratively performing preprocessing of the problem information until the preprocessed problem information is determined to be in an acceptable level of accuracy as input to the machine learning system, wherein the preprocessing comprises term frequency-inverse document frequency analysis;
performing machine learning analysis of the problem information and the product information, wherein
the machine learning analysis produces one or more model outputs,
the machine learning analysis is performed by the machine learning system of the resolution identification system,
the machine learning analysis is performed using one or more machine learning models, wherein at least one of the one or more machine learning models is trained as a logistic regression model, and
each of the one or more machine learning models produces a corresponding one of the one or more model outputs, wherein at least one of the one or more machine learning models classifies the problem information as a problem type, wherein the one or more machine learning models comprises a guided path model, a soft model and a hard model and wherein the one or more model outputs comprises a guided path solution, a soft solution and a hard solution, wherein the one or more model outputs is associated with a respective guided path solution display, software solution display and hard solution display;
updating business rule information based on the problem type;
generating resolution information by performing an action identification operation using the one or more model outputs; and
outputting the resolution information from the resolution identification system, wherein
the resolution information is output to the user interface, wherein the user interface comprises an individual model predictions display comprising the guided path solution display rendering the guided path solution and a guided path solution confidence level indicator, the software solution display rendering the soft solution and a software solution confidence level indicator, and the hard solution display rendering the hard solution and a hard solution confidence level indicator, and wherein the user interface comprises at least one user feedback field accepting input associated with the resolution information that is outputted by the individual model predictions display.

12. The non-transitory computer-readable storage medium of claim 11, wherein the method further comprises:
retrieving one or more system attributes for a product identified by the product information, and
retrieving a support history for the product, wherein
the product information comprises tag information for a product, and
the problem information comprises at least one of
error information regarding an error experienced in operation of the product, or
symptom information regarding a symptom exhibited by the product in the operation of the product.

13. The non-transitory computer-readable storage medium of claim 11, wherein the method further comprises:
performing an outcome analysis, wherein
the outcome analysis is based, at least in part, on the resolution information,
the machine learning analysis is performed by one or more machine learning systems of the resolution identification system, and
a result of the outcome analysis is fed back to the one or more machine learning systems.

14. The non-transitory computer-readable storage medium of claim 11, wherein the method further comprises:
performing data processing on the problem information, wherein
the data processing comprises
generating prepared data by performing a data cleansing operation on the problem information, and
performing natural language processing on the prepared data;
identifying one or more historically successful resolutions, wherein
the one or more historically successful resolutions are identified by analyzing existing historical data; and
creating a sub-intelligence engine, wherein
the sub-intelligence engine is created using a portion of the problem information.

15. The non-transitory computer-readable storage medium of claim 11, wherein the one or more machine learning models comprise at least one of
a guided path model,
a soft model,
a hard model, or
a cluster model.

16. A system comprising:
one or more processors; and
a computer-readable storage medium coupled to the one or more processors, comprising program instructions, which, when executed by the one or more processors, perform a method comprising:
receiving problem information from a user interface, wherein
the problem information is received at a resolution identification system, and
the problem information describes one or more characteristics of a problem;
receiving product information at the resolution identification system, wherein
the product information describes one or more characteristics of a product;
training a machine learning system using a logistic regression function;

iteratively performing preprocessing of the problem information until the preprocessed problem information is determined to be in an acceptable level of accuracy as input to the machine learning system, wherein the preprocessing comprises term frequency-inverse document frequency analysis;

performing machine learning analysis of the problem information and the product information, wherein the machine learning analysis produces one or more model outputs, the machine learning analysis is performed by the machine learning system of the resolution identification system, the machine learning analysis is performed using one or more machine learning models, wherein at least one of the one or more machine learning models is trained as a logistic regression model, and each of the one or more machine learning models produces a corresponding one of the one or more model outputs, wherein at least one of the one or more machine learning models classifies the problem information as a problem type, wherein the one or more machine learning models comprises a guided path model, a soft model and a hard model and wherein the one or more model outputs comprises a guided path solution, a soft solution and a hard solution, wherein the one or more model outputs is associated with a respective guided path solution display, software solution display and hard solution display;

updating business rule information based on the problem type;

generating resolution information by performing an action identification operation using the one or more model outputs; and outputting the resolution information from the resolution identification system, wherein the resolution information is output to the user interface, wherein the user interface comprises an individual model predictions display comprising the guided path solution display rendering the guided path solution and a guided path solution confidence level indicator, the software solution display rendering the soft solution and a software solution confidence level indicator, and the hard solution display rendering the hard solution and a hard solution confidence level indicator, and wherein the user interface comprises at least one user feedback field accepting input associated with the resolution information that is outputted by the individual model predictions display.

17. The system of claim 16, wherein the method further comprises:
retrieving one or more system attributes for a product identified by the product information, and
retrieving a support history for the product, wherein
the product information comprises tag information for a product, and
the problem information comprises at least one of
error information regarding an error experienced in operation of the product, or
symptom information regarding a symptom exhibited by the product in the operation of the product.

18. The system of claim 16, wherein the method further comprises:
performing an outcome analysis, wherein
the outcome analysis is based, at least in part, on the resolution information,
the machine learning analysis is performed by one or more machine learning systems of the resolution identification system, and
a result of the outcome analysis is fed back to the one or more machine learning systems.

19. The system of claim 16, wherein the method further comprises:
performing data processing on the problem information, wherein
the data processing comprises
generating prepared data by performing a data cleansing operation on the problem information, and
performing natural language processing on the prepared data;
identifying one or more historically successful resolutions, wherein
the one or more historically successful resolutions are identified by analyzing existing historical data; and
creating a sub-intelligence engine, wherein
the sub-intelligence engine is created using a portion of the problem information.

20. The system of claim 16, wherein
the one or more machine learning models comprise at least one of
a guided path model,
a soft model,
a hard model, or
a cluster model.

* * * * *